(12) United States Patent
Liu et al.

(10) Patent No.: US 11,368,266 B2
(45) Date of Patent: Jun. 21, 2022

(54) UPLINK SIGNAL TRANSMISSION METHOD, AND DEVICE

(71) Applicant: HUAWEI TECHNOLOGIES CO., LTD., Guangdong (CN)

(72) Inventors: Yun Liu, Shenzhen (CN); Jian Wang, Beijing (CN); Da Wang, Shenzhen (CN); Yifan Xue, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/638,002

(22) PCT Filed: Aug. 11, 2017

(86) PCT No.: PCT/CN2017/097255
§ 371 (c)(1),
(2) Date: Feb. 10, 2020

(87) PCT Pub. No.: WO2019/028903
PCT Pub. Date: Feb. 14, 2019

(65) Prior Publication Data
US 2020/0220679 A1 Jul. 9, 2020

(51) Int. Cl.
*H04W 72/04* (2009.01)
*H04W 72/12* (2009.01)
*H04L 5/00* (2006.01)

(52) U.S. Cl.
CPC ....... *H04L 5/0048* (2013.01); *H04W 72/0446* (2013.01); *H04W 72/12* (2013.01)

(58) Field of Classification Search
CPC .. H04W 72/12; H04W 72/0446; H04L 5/0048
See application file for complete search history.

(56) References Cited

U.S. PATENT DOCUMENTS

| 2017/0048717 A1 | 2/2017 | Yoo et al. |
| 2018/0343090 A1 | 11/2018 | Yan et al. |

FOREIGN PATENT DOCUMENTS

| CN | 101404794 A | 4/2009 |
| CN | 101610607 A | 12/2009 |
| CN | 102378383 A | 3/2012 |
| CN | 105472745 A | 4/2016 |
| CN | 105850205 A | 8/2016 |
| JP | 2016534595 A | 11/2016 |

(Continued)

OTHER PUBLICATIONS

XP051242351 R1-1704199 Huawei, HiSilicon, "Considerations of NR UL operation for LTE-NR coexistence",3GPP TSG RAN WGl Meeting #88bis Spokane, USA, Apr. 3-7, 2017,total 7 pages.

(Continued)

*Primary Examiner* — Angel T Brockman

(57) ABSTRACT

An uplink signal transmission method includes: receiving, by a terminal device, first information that is sent by a network device and that is used to instruct the terminal device to send an SRS on at least two symbols in a first slot, and second information that is sent by the network device and that is used to instruct the terminal device not to send the SRS on M symbols in the at least two symbols, where M is an integer greater than 0; and sending, by the terminal device based on the received first information and the received second information, the SRS on a symbol that is in the at least two symbols and that is different from the M symbols.

20 Claims, 14 Drawing Sheets

(56) References Cited

FOREIGN PATENT DOCUMENTS

| JP | 2017518707 | A  | 7/2017  |
|----|------------|----|---------|
| JP | 2020528707 | A  | 9/2020  |
| KR | 20150042682| A  | 4/2015  |
| WO | 2009132591 | A1 | 11/2009 |
| WO | 2016036158 | A1 | 3/2016  |
| WO | 2017014606 | A1 | 1/2017  |
| WO | 2017132964 | A1 | 8/2017  |

OTHER PUBLICATIONS

XP051300428 R1-1711229 Qualcomm Incorporated,"NR-LTE Co-channel Coexistence Considerations",3GPP TSG-RAN WG1 NR#2 Jun. 27 30, 2017 Qingdao, P.R. China,total 5 pages.

3GPP TS 38.331 V0.0.4 (Jun. 2017),3rd Generation Partnership Project;Technical Specification Group Radio Access Network; NR;Radio Resource Control (RRC);Protocol specification(Release 15), total 22 pages.

R1-1710409 Mitsubishi Electric,"Views on SRS designs",3GPP TSG RAN WG1 Meeting Ad hoc ,Qingdao, P.R. China Jun. 27 30, 2017,total 8 pages.

R1-1706938 Huawei, HiSilicon,"UL SRS design for beam management, CSI acquisition",3GPP TSG RAN WG1 Meeting #89,Hangzhou, China, May 15-19, 2017,total 9 pages.

Ericsson et al.,"SRS Design", 3GPP TSG-RAN WG1 #89 Hangzhou, China, May 15-19, 2017, R1-1708709, total 10pages.

UPLINK SIGNAL TRANSMISSION METHOD, AND DEVICE

CROSS-REFERENCE TO RELATED APPLICATIONS

This application is a national stage of International Application No. PCT/CN2017/097255, filed Aug. 11, 2017, which is hereby incorporated by reference in its entirety.

TECHNICAL FIELD

This application relates to the field of communications technologies, and in particular, to an uplink signal transmission method and a device.

BACKGROUND

One slot includes a plurality of time domain symbols, and for convenience of description, a "time domain symbol" is briefly referred to as a "symbol" below. In a long term evolution (long term evolution, LTE) system, uplink signals include a sounding reference signal (sounding reference signal, SRS) and an physical uplink control signal (physical uplink control channel, PUCCH). The SRS may be transmitted by occupying the last symbol in a slot, and the PUCCH may be transmitted by occupying last 14 consecutive symbols in the slot. However, when the SRS is transmitted on the last symbol in the slot, the PUCCH cannot be transmitted by occupying the last symbol.

In a new radio communications system of a 5th generation mobile communications technology (5th generation new radio, 5G NR), uplink signals include an SRS and a PUCCH. The PUCCH may be transmitted by occupying a plurality of last consecutive symbols in the slot. Different from that in the LTE system, the SRS in the 5G system may also be transmitted by occupying a plurality of last consecutive symbols in the slot. Because symbol resources available for transmitting the SRS and the PUCCH in the slot are limited, in the 5G system, in an actual resource allocation process, a conflict easily occurs between an allocated symbol used to transmit the SRS and an allocated symbol used to transmit the PUCCH. The PUCCH may alternatively be an uplink signal different from the SRS.

In a scenario in which the 5G system and the LTE system coexist, an SRS in the LTE system may be transmitted by occupying the last symbol in a slot, the uplink signals including the SRS and the PUCCH in the 5G system may be transmitted by occupying a plurality of last consecutive symbols in the slot, and the plurality of symbols include the last symbol in the slot. Therefore, in an actual resource allocation process, a conflict easily occurs between an allocated symbol used to transmit the SRS in the LTE system and an allocated symbol used to transmit the uplink signal in the 5G system.

In conclusion, based on a design in which the uplink signal may be transmitted by occupying the plurality of last consecutive symbols in the slot in the 5G system, a conflict easily occurs between the symbol used to transmit the SRS and the symbol used to transmit the uplink signal different from the SRS in the 5G system, and a conflict easily occurs between the symbol used to transmit the SRS in the LTE system and the symbol used to transmit the uplink signal in the 5G system in a scenario in which the 5G system and the LTE system coexist.

SUMMARY

Embodiments of this application provide an uplink signal transmission method and a device, to resolve a problem that a conflict easily occurs between a symbol used to transmit an SRS and a symbol used to transmit an uplink signal different from the SRS in a 5G system and a problem that a conflict easily occurs between a symbol used to transmit an SRS in an LTE system and a symbol used to transmit an uplink signal in the 5G system in a scenario in which the 5G system and the LTE system coexist.

According to a first aspect, an embodiment of this application provides an uplink signal transmission method. A network device sends, to a terminal device, first information used to instruct the terminal device to send an SRS on at least two symbols in a first slot, and second information used to instruct the terminal device not to send the SRS on M symbols in the at least two symbols. After receiving the first information and the second information that are sent by the network device, the terminal device sends, based on the received first information and the received second information, the SRS on a symbol that is in the at least two symbols and that is different from the M symbols, where M is an integer greater than 0.

The SRS is an SRS in a 5G system. The second information may be used to instruct the terminal device to send another uplink signal different from the SRS on the M symbols in the at least two symbols, and the another uplink signal may include uplink control signaling.

According to the foregoing method, a case in which the terminal device sends the SRS and the another uplink signal on the M symbols in the at least two symbols in the first slot can be avoided, so that a conflict that occurs between a symbol used to transmit the SRS and a symbol used to transmit the another uplink signal in the 5G system can be avoided.

In a possible implementation, after the terminal device sends the SRS on the symbol that is in the at least two symbols and that is different from the M symbols, the network device sends scheduling information to the terminal device, and the scheduling information is used to schedule the terminal device to send the SRS in a second slot that follows the first slot. The SRS sent in the second slot is a subset of the SRS that is indicated in the first information and that is sent on the at least two symbols. In other words, the SRS sent in the second slot may be a part of or all of the SRS that is indicated in the first information and that is sent in the at least two symbols. After receiving the scheduling information sent by the network device, the terminal device sends, based on the scheduling information, the SRS in the second slot that follows the first slot.

The SRS sent in the second slot includes the SRS that is not sent on the M symbols. The scheduling information is further used to indicate a symbol occupied when the terminal device is scheduled to send the SRS in the second slot. The method for sending the SRS by the terminal device based on the scheduling information in the second slot that follows the first slot may be performed in the following two cases:

Case 1: When the SRS is used for channel detection, after receiving the scheduling information sent by the network device, the terminal device sends, based on the scheduling information, the SRS in a specified frequency domain position in the second slot that follows the first slot, and/or the scheduling information indicates the symbol occupied when the terminal device is scheduled to send the SRS in the second slot. The network device receives the SRS sent by the terminal device in the specified frequency domain position in the second slot that follows the first slot. The specified frequency domain position may be a corresponding frequency domain position in which the SRS is not sent by the terminal device on the M symbols in the first slot.

According to the foregoing method, the network device can receive, in the second slot, the SRS sent by the terminal device in the frequency domain position in which the SRS is not sent in the first slot. Therefore, the network device can complete the channel detection for the corresponding frequency domain position in which the SRS is not sent in the first slot, so that a time used by the network device to complete channel detection can be shortened.

Case 2: When the SRS is used for beam traversal, after receiving the scheduling information sent by the network device, the terminal device sends, based on the scheduling information, the SRS on a specified beam in the second slot that follows the first slot, and/or the scheduling information indicates the symbol occupied when the terminal device is scheduled to send the SRS in the second slot. The network device receives the SRS sent by the terminal device on the specified beam in the second slot that follows the first slot. The specified beam may be a corresponding beam on which the SRS is not sent on the M symbols in the first slot.

According to the foregoing method, the network device can receive, in the second slot, the SRS sent by the terminal device on the corresponding beam on which the SRS is not sent in the first slot, so that the network device can complete traversal of the corresponding beam on which the SRS is not sent in the first slot, and then a time used by the network device to complete beam traversal can be shortened.

In a possible implementation, the terminal device sends the SRS at a first power on the symbol that is in the at least two symbols and that is different from the M symbols, and the terminal device sends the SRS at a second power on the M symbols. The network device receives the SRS sent by the terminal device at the first power on the symbol that is in the at least two symbols and that is different from the M symbols, and receives the SRS sent by the terminal device at the second power on the M symbols. Alternatively, the terminal device sends the SRS at a first power on the symbol that is in the at least two symbols and that is different from the M symbols, and the terminal device sends the another uplink signal different from the SRS at a second power on the M symbols. The network device receives the SRS sent by the terminal device at the first power on the symbol that is in the at least two symbols and that is different from the M symbols, and receives the another uplink signal different from the SRS sent by the terminal device at the second power on the M symbols. The second power is less than the first power, and the first power is an original transmit power for sending the SRS.

Correspondingly, after sending the SRS or the another uplink signal different from the SRS at the second power on the M symbols, the terminal device may send a notification message to the network device, and the network device receives the notification message sent by the terminal device. The notification message is used by the network device to determine that a transmit power of the terminal device on the M symbols is the second power.

In this way, the network device can perform channel detection or beam traversal based on the received SRS sent by the terminal device on the M symbols and a decrease value of the second power relative to the first power.

According to a second aspect, an embodiment of this application provides an uplink signal transmission method. A network device sends, to a terminal device, first information used to instruct the terminal device to send a sounding reference signal SRS on at least two symbols in a slot, and second information used to determine a frequency domain position or a beam identifier occupied when the terminal device sends the SRS. After receiving the first information and the second information that are sent by the network device, the terminal device sends, based on the received first information and the received second information, the SRS in the frequency domain position corresponding to the at least two symbols or on the beam identifier corresponding to the at least two symbols. The network device receives the SRS sent by the terminal device in the frequency domain position corresponding to the at least two symbols or on the beam identifier corresponding to the at least two symbols.

According to the foregoing method, a case in which the terminal device sends the SRS each time in a same frequency domain position in which a conflict occurs or on a same beam identifier on which a conflict occurs can be avoided, and then a possibility that a conflict occurs between a symbol used to transmit the SRS and a symbol used to transmit the another uplink signal in the 5G system can be reduced.

In a possible implementation, when the second information is used to indicate a frequency domain offset value of the SRS, the terminal device sends, based on the first information and the second information, the SRS on the at least two symbols in each period from a next period of sending the SRS, and a frequency domain position used when the SRS is sent in each period is obtained by adding the frequency domain offset value to a frequency domain position for sending the SRS in a previous period. The network device may receive the SRS sent by the terminal device on the at least two symbols in each period.

In this way, a case in which the terminal device sends the SRS each time in a same frequency domain position in which a conflict occurs can be avoided in each period from the next period of sending the SRS, and then a possibility that a conflict occurs between a symbol used to transmit the SRS and a symbol used to transmit the another uplink signal in the 5G system can be reduced. In addition, in comparison with an existing channel detection process, the frequency domain position occupied when the terminal device sends the SRS on the at least two symbols in each period from the next period of sending the SRS is obtained after frequency domain offset is performed for the frequency domain position in the previous period. Therefore, if there is a conflict on some symbols in a period, another conflict on these symbols is avoided in a next period because different frequency domain positions are caused by frequency domain offset, so that a time used by the network device to complete channel detection can be shortened.

In a possible implementation, when the second information is used to indicate a beam offset value of the SRS, the terminal device sends, based on the first information and the second information, the SRS on the at least two symbols in each period from a next period of sending the SRS, and a beam identifier used when the SRS is sent in each period is obtained by adding the beam offset value to a beam identifier for sending the SRS in a previous period. The network device may receive the SRS sent by the terminal device on the at least two symbols in each period.

In this way, a case in which the terminal device sends the SRS each time on a same beam identifier on which a conflict occurs can be avoided in each period from the next period of sending the SRS, and then a possibility that a conflict occurs between a symbol used to transmit the SRS and a symbol used to transmit the another uplink signal in the 5G system can be reduced. In addition, in comparison with an existing beam traversal process, the beam occupied when the terminal device sends the SRS on the at least two symbols in each period from the next period of sending the SRS is obtained after beam offset is performed for the beam in the previous period. Therefore, if there is a conflict on some symbols in a period, a conflict on these symbols can be further avoided in a next period because different beam identifiers are caused by beam offset, and a time used by the network device to complete beam traversal can be shortened.

According to a third aspect, an embodiment of this application provides an uplink signal transmission method. A network device sends, to a terminal device, first information used to instruct the terminal device to send a first uplink signal of a first system on at least two symbols in a slot, and second information used to indicate that a second uplink signal of a second system occupies N symbols in the at least two symbols. After receiving the first information and the second information that are sent by the network device, the terminal device sends, based on the received first information and the received second information, the first uplink signal on a symbol that is in the at least two symbols and that is different from the N symbols, and the network device receives the first uplink signal sent by the terminal device on the symbol that is in the at least two symbols and that is different from the N symbols, where N is an integer greater than 0.

The first system is a 5G system, and the second system is an LTE system. In a possible implementation, the first uplink signal includes one of or a combination of the following signals: an SRS in the 5G system, uplink control signaling in the 5G system, and an uplink signal used for random access in the 5G system. The second uplink signal includes one of or a combination of the following signals: an SRS in the LTE system, uplink control signaling in the LTE system, and an uplink signal used for random access in the LTE system.

According to the foregoing method, a case in which the terminal device sends an uplink signal in the 5G system and an uplink signal in the LTE system on the N symbols in a scenario in which the 5G system and the LTE system coexist can be avoided. Therefore, a problem that a conflict easily occurs between a symbol used to transmit an SRS in the LTE system and a symbol used to transmit the uplink signal in the 5G system in a scenario in which the 5G system and the LTE system coexist can be resolved.

In a possible implementation, there may be two methods in which the terminal device sends, based on the first information and the second information, the first uplink signal on the symbol that is in the at least two symbols and that is different from the N symbols, and the two methods are as follows:

Method 1: The terminal device sends all signals or some signals in the first uplink signal on the symbol that is in the at least two symbols in a slot and that is different from the N symbols, and the network device receives all signals or some signals in the first uplink signal sent by the terminal device on the symbol that is in the at least two symbols in the slot and that is different from the N symbols.

Method 2: The terminal device sends a third uplink signal of the second system on the N symbols, and the third uplink signal carries information or a function carried in the first uplink signal that is not sent on the N symbols. The network device receives the third uplink signal of the second system sent by the terminal device on the N symbols, and the third uplink signal carries information or a function carried in the first uplink signal that is not sent on the N symbols. Further, the terminal device may send the third uplink signal of the second system in a frequency domain position that is not occupied by the second uplink signal of the second system, and the network device may receive the third uplink signal that is of the second system and that is sent by the terminal device in the frequency domain position that is not occupied by the second uplink signal of the second system.

In a possible implementation, the first system and the second system jointly occupy a single frequency band or at least two frequency bands.

In a possible implementation, a frequency band covered by a sounding reference signal SRS in the first uplink signal includes a frequency band covered by uplink control signaling in the first uplink signal and/or a frequency band covered by an uplink signal used for random access in the first uplink signal.

According to a fourth aspect, an embodiment of this application provides a terminal device, and the terminal device has a function of implementing behavior of the terminal device in the method example of the first aspect. A structure of the terminal device includes a processing unit and a transceiver unit. The processing unit is configured to perform, by using the transceiver unit, the method according to any one of the implementations of the first aspect, and the transceiver unit is configured to receive data and/or send data.

According to a fifth aspect, an embodiment of this application provides a network device, and the network device has a function of implementing behavior of the network device in the method example of the first aspect. A structure of the network device includes a processing unit and a transceiver unit. The processing unit is configured to perform, by using the transceiver unit, the method according to any one of the implementations of the first aspect, and the transceiver unit is configured to receive data and/or send data.

According to a sixth aspect, an embodiment of this application further provides a terminal device, and the terminal device has a function of implementing behavior of the terminal device in the method example of the second aspect. A structure of the terminal device includes a memory, a processor and a transceiver. The memory is configured to store a computer-readable program; the transceiver is configured to receive data and/or transmit data under control of the processor; and the processor is configured to invoke an instruction stored in the memory, to perform, by using the transceiver, the method according to any one of the implementations of the second aspect.

According to a seventh aspect, an embodiment of this application provides a network device, and the network device has a function of implementing behavior of the network device in the method example of the second aspect. A structure of the network device includes a memory, a processor, and a transceiver. The memory is configured to store a computer-readable program; the transceiver is configured to receive data and/or transmit data under control of the processor; and the processor is configured to invoke an instruction stored in the memory, to perform, by using the transceiver, the method according to any one of the implementations of the second aspect.

According to an eighth aspect, an embodiment of this application provides a terminal device, and the terminal device has a function of implementing behavior of the terminal device in the method example of the third aspect. A structure of the terminal device includes a memory, a processor, and a transceiver. The memory is configured to store a computer-readable program; the transceiver is configured to receive data and/or transmit data under control of the processor; and the processor is configured to invoke an instruction stored in the memory, to perform, by using the transceiver, the method according to any one of the implementations of the third aspect.

According to a ninth aspect, an embodiment of this application provides a network device, and the network device has a function of implementing behavior of the network device in the method example of the third aspect. A structure of the network device includes a memory, a processor, and a transceiver. The memory is configured to store a computer-readable program; the transceiver is configured to receive data and/or transmit data under control of the processor; and the processor is configured to invoke an instruction stored in the memory, to perform, by using the transceiver, the method according to any one of the implementations of the third aspect.

According to a tenth aspect, an embodiment of this application further provides a computer storage medium. The storage medium stores a software program, and when the software program is read and executed by one or more processors, the method according to any one of the first aspect to the ninth aspect may be implemented, or when the software program is read and executed by one or more processors, the method according to any one of the first aspect to the sixth aspect may be implemented.

According to an eleventh aspect, an embodiment of this application further provides a terminal device, and the device includes a chip. The chip may be configured to perform the method according to any one of the first aspect or the implementations of the first aspect, and the chip performs, by using a transceiver (or a communications module), the method performed by the terminal device in any one of the first aspect or the implementations of the first aspect. Alternatively, the chip may be configured to perform the method according to any one of the second aspect or the implementations of the second aspect, and the chip performs, by using a transceiver (or a communications module), the method performed by the terminal device in any one of the second aspect or the implementations of the second aspect. Alternatively, the chip may be configured to perform the method according to any one of the third aspect or the implementations of the third aspect, and the chip performs, by using a transceiver (or a communications module), the method performed by the terminal device in any one of the third aspect or the implementations of the third aspect.

According to a twelfth aspect, an embodiment of this application further provides a network device, and the device includes a chip. The chip may be configured to perform the method according to any one of the first aspect or the implementations of the first aspect, and the chip may perform, by using a transceiver (or a communications module), the method performed by the network device in any one of the first aspect or the implementations of the first aspect. Alternatively, the chip may be configured to perform the method according to any one of the second aspect or the implementations of the second aspect, and the chip may perform, by using a transceiver (or a communications module), the method performed by the network device in any one of the second aspect or the implementations of the second aspect. Alternatively, the chip may be configured to perform the method according to any one of the third aspect or the implementations of the third aspect, and the chip may perform, by using a transceiver (or a communications module), the method performed by the network device in any one of the third aspect or the implementations of the third aspect.

According to a thirteenth aspect, an embodiment of this application further provides a communications system, and the communications system includes a terminal device and a network device. The terminal device and the network device may cooperate to perform the method according to any one of the first aspect or the implementations of the first aspect, or the terminal device and the network device may cooperate to perform the method according to any one of the second aspect or the implementations of the second aspect, or the terminal device and the network device may cooperate to perform the method according to any one of the third aspect or the implementations of the third aspect.

DESCRIPTION OF EMBODIMENTS

In a process in which a terminal device communicates with a network device, the terminal device sends a plurality of types of uplink signals to the network device. One type of uplink signal is an SRS, and the SRS can be classified into two types based on functions of the SRS. One type of SRS can be used for channel measurement, and the other type of SRS can be used for beam traversal. Another type of uplink signal is a PUCCH, and the PUCCH can be used to assist the network device in completing scheduling of the terminal device.

Figure 1A:
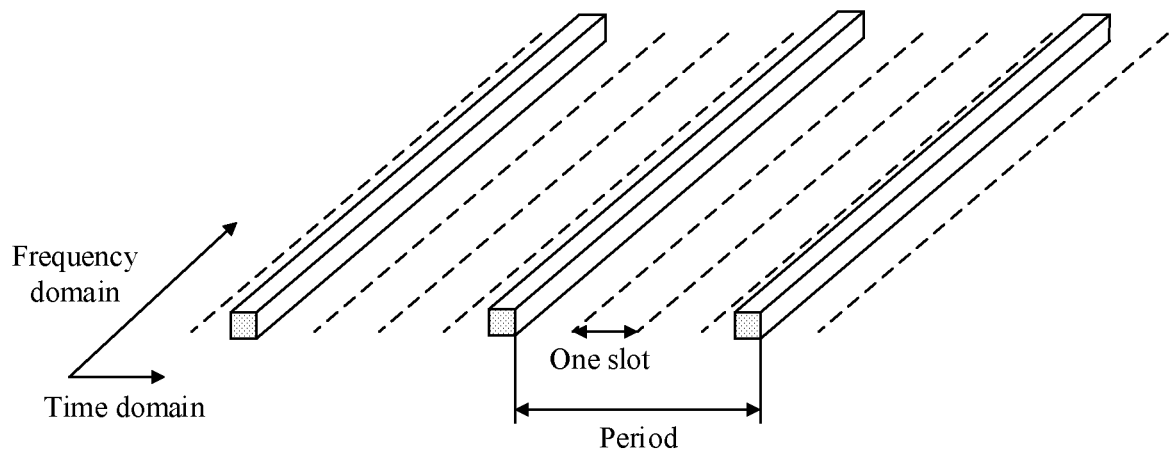
FIG. 1A is a schematic diagram of a non-hopping transmission method in the prior art.
Figure 1B:
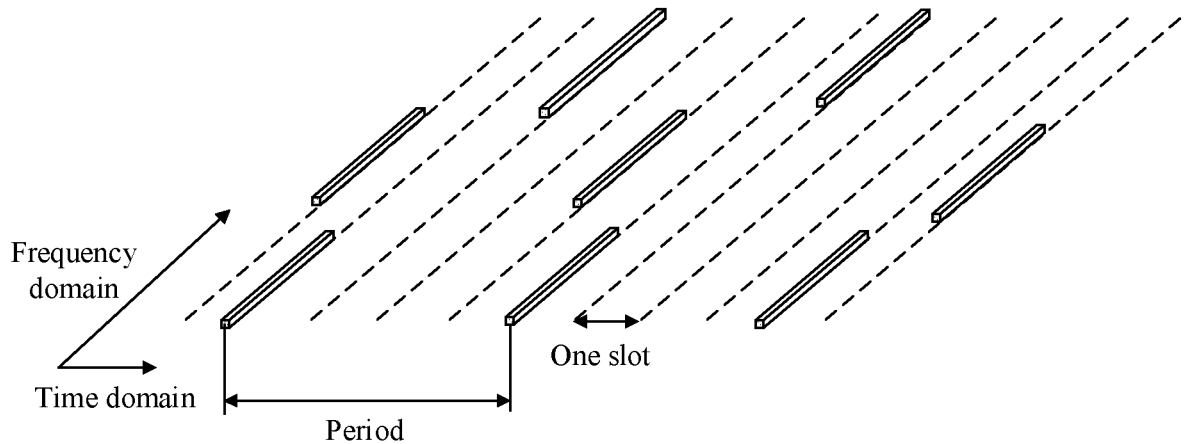
FIG. 1B is a schematic diagram of a hopping transmission method in the prior art.

For the SRS used for channel measurement, the terminal device sends SRSs to the network device in different frequency domain positions, so that the network device can detect channel quality in different frequency domain positions by using SRSs received at different frequency domain positions. A method in which the terminal device sends, in different frequency domain positions, SRSs used for channel measurement to the network device is that the terminal device may periodically send the SRSs to the network device in different frequency domain positions in a non-frequency hopping manner. For example, a period of sending the SRSs is four slots. As shown in FIG. 1A, the terminal device sends the SRSs to the network device at all frequency bands in each period. Another method in which the terminal device sends, in different frequency domain positions, the SRSs used for channel measurement to the network device is that the terminal device may periodically send the SRSs to the network device in different frequency domain positions in a frequency hopping manner. For example, a period of sending the SRS is four slots. As shown in FIG. 1B, the terminal device sends the SRSs to the network device at different frequency bands in different slots in each period.

For the SRS used for beam traversal, the terminal device sends SRSs to the network device in a frequency domain position by using different beams, so that the network device can determine, by using SRSs received on different beams, a beam having optimal channel quality. The beam having optimal channel quality is used to perform subsequent uplink transmission by the terminal device that sends the SRSs.

In an LTE system, an SRS in an uplink signal may be transmitted by occupying the last symbol in a slot, and a PUCCH in the uplink signal may be transmitted by occupying last 14 consecutive symbols in the slot. When the SRS is transmitted on the last symbol in the slot, the PUCCH cannot be transmitted by occupying the last symbol, to avoid a conflict that occurs between the symbol used to transmit the SRS and a symbol used to transmit the PUCCH in LTE.

In an uplink signal of a 5G system, a PUCCH may be transmitted by occupying at least last two consecutive symbols in a slot. Different from that in the LTE system, an SRS in the 5G system may also be transmitted by occupying the at least last two consecutive symbols in the slot. Because symbol resources available for transmitting the SRS and the PUCCH in the slot are limited, in the 5G system, in an actual resource allocation process, a conflict easily occurs between an allocated symbol used to transmit the SRS and an allocated symbol used to transmit the PUCCH.

The following describes a problem that the conflict occurs between the symbol used to transmit the SRS and the allocated symbol used to transmit the PUCCH in the 5G system with reference to the accompanying drawings.

Figure 2A:
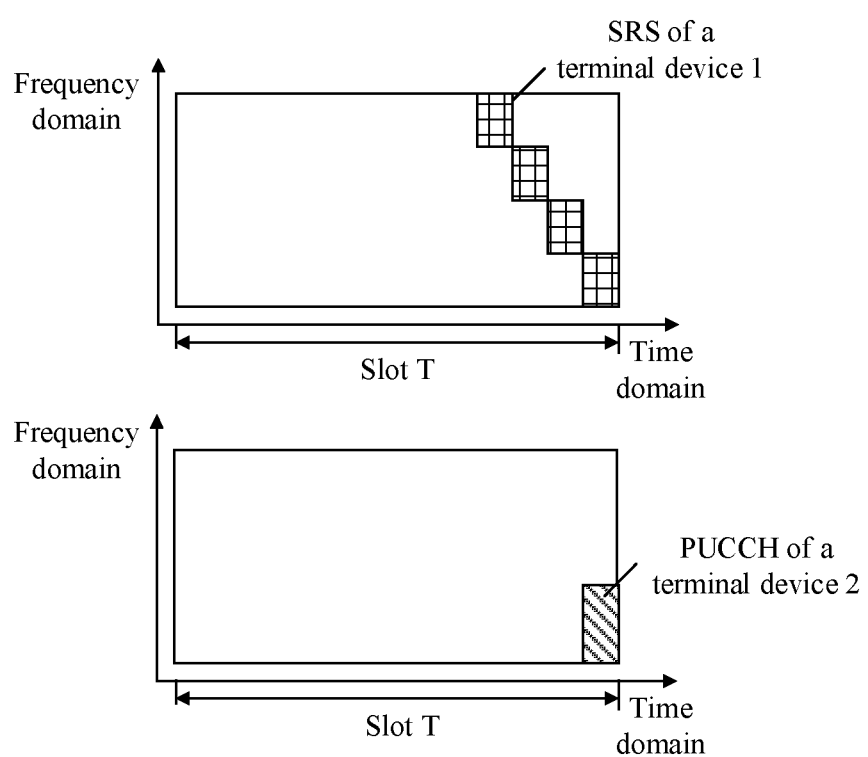
FIG. 2A is a schematic diagram of a scenario in which an SRS and a PUCCH of a 5G system are transmitted in the prior art.

As shown in FIG. 2A, assuming that symbols allocated by a network device to a terminal device 1 for transmitting an SRS are the last four consecutive symbols in a slot T, and a symbol allocated by the network device to a terminal device 2 for transmitting a PUCCH is the last symbol in the slot T, it can be learned that both the SRS and the PUCCH occupy the last symbol in the slot T. If a frequency domain position occupied by the SRS of the terminal device 1 overlaps a frequency domain position occupied by the PUCCH of the terminal device 1 on the last symbol in the slot T, the SRS of the terminal device 1 and the PUCCH of the terminal device 2 are interfered by each other on the last symbol in the slot T. The PUCCH may alternatively be another uplink signal different from the SRS. In conclusion, in the 5G system, mutual interference is caused when different terminal devices send the SRS and the another uplink signal different from the SRS in a same frequency domain position corresponding to a same symbol.

Figure 2B:
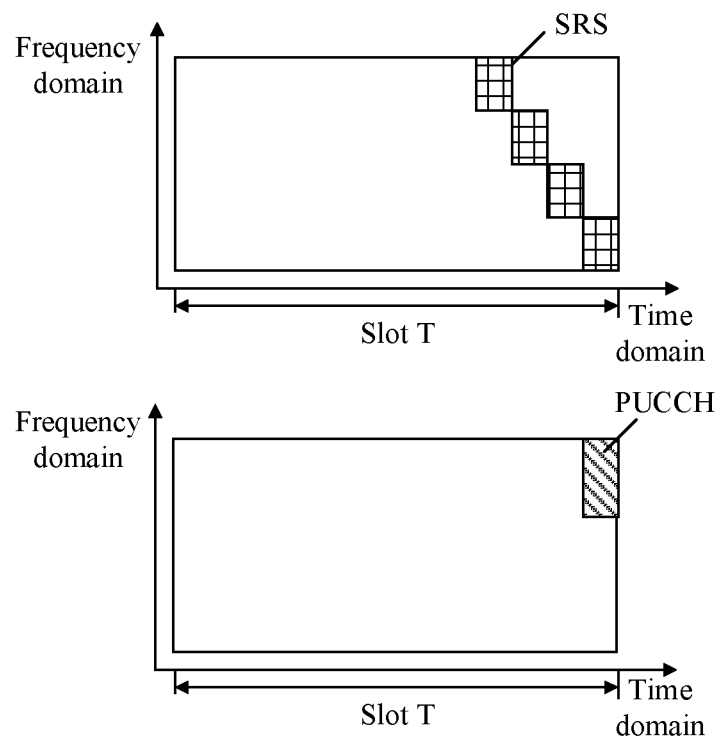
FIG. 2B is a schematic diagram of another scenario in which an SRS and a PUCCH of a 5G system are transmitted in the prior art.

As shown in FIG. 2B, assuming that symbols allocated by a network device to a terminal device 1 for transmitting an SRS are the last four consecutive symbols in a slot T, and a symbol allocated by the network device to a terminal device 1 for transmitting a PUCCH is the last symbol in the slot T, it can be learned that both the SRS and the PUCCH occupy the last symbol in the slot T. Because a transmit power of the terminal device 1 on a symbol is limited, transmitting the SRS and the PUCCH by the terminal device 1 on the last symbol in the slot T causes a decrease in a power of sending the SRS and a decrease in a power of sending the PUCCH, and consequently, the network device cannot accurately perform channel detection or beam traversal based on a received SRS. The PUCCH may alternatively be another uplink signal different from the SRS. In conclusion, in the 5G system, transmitting the SRS and the another uplink signal different from the SRS by a same terminal device on the same symbols causes a decrease in a power of sending the SRS, and consequently, the network device cannot accurately perform the channel detection or the beam traversal based on the received SRS.

To resolve the problem that a conflict easily occurs between a symbol used to transmit the SRS and a symbol used to transmit the uplink signal different from the SRS in the 5G system, an embodiment of this application further provides an uplink signal transmission method and a device, and the technical solution may be applied to a scenario in which the 5G system exists. The method and the device are based on a same concept. Because a problem-resolving principle of the method is similar to that of the device, mutual reference may be made to method implementation and device implementation, and repeated parts are not described.

In a scenario in which the 5G system and the LTE system coexist, the SRS in the LTE system may be transmitted by occupying at least one symbol in a slot, and the uplink signal including the SRS and the PUCCH in the 5G system may be transmitted by occupying at least last two consecutive symbols in a slot. Therefore, in the actual resource allocation process, a conflict easily occurs between an allocated symbol used to transmit the SRS in the LTE system and an allocated symbol used to transmit the uplink signal in the 5G system.

To resolve the problem that a conflict easily occurs between a symbol used to transmit the SRS in the LTE system and a symbol used to transmit the uplink signal in the 5G system in a scenario in which the 5G system and the LTE system coexist, an embodiment of this application further provides an uplink signal transmission method and a device, and the solution may be applied to the scenario in which the 5G system and the LTE system coexist. The method and the device are based on a same concept. Because a problem-resolving principle of the method is similar to that of the device, mutual reference may be made to method implementation and device implementation, and repeated parts are not described.

Figure 3:
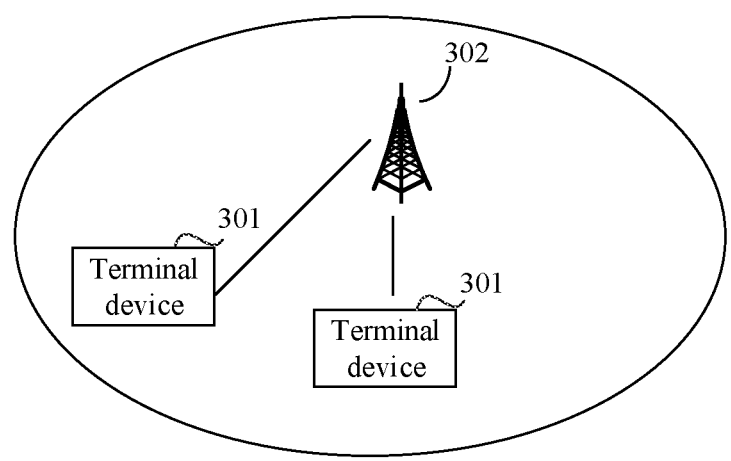
FIG. 3 is a schematic architectural diagram of a network architecture according to an embodiment of this application.

FIG. 3 is a schematic diagram of a network architecture to which an embodiment of this application is applicable. FIG. 3 relates to a terminal device 301 and a network device 302. FIG. 3 shows only two terminal devices 301 and one network device 302. In an actual application, there may be one or at least two terminal devices 301 and network devices 302, and the network device 302 interacts with the terminal device 301. When the network architecture shown in FIG. 3 is a network architecture of a 5G system, the network device 302 in FIG. 3 may receive an uplink signal in the 5G system sent by the terminal device 301. For example, the uplink signal may be an SRS, a PUCCH, a signal used for random access, or the like. When the network architecture shown in FIG. 3 is a network architecture in a scenario in which the 5G system and an LTE system coexist, the network device 302 in FIG. 3 may receive the uplink signal in the 5G system sent by the terminal device 301 and an uplink signal in the LTE system sent by the terminal device 301. For example, the uplink signal in the 5G system may be the SRS, the PUCCH, and the signal used for random access in the 5G system, and the uplink signal in the LTE system may be an SRS, a PUCCH, a signal used for random access, and the like in the LTE system.

The terminal device in the embodiments of this application may be a device that provides a user with voice and/or data connectivity, a handheld device having a wireless connection function, or another processing device connected to a wireless modem. In different systems, the terminal device may have different names, for example, the terminal device may be referred as to user equipment (user equipment, UE). The wireless terminal device may communicate with one or at least two core networks through a RAN. The wireless terminal device may be a mobile terminal device, such as a mobile phone (or referred to as a "cellular" phone) or a computer equipped with a mobile terminal device. For example, the wireless terminal device may be a portable, pocket-sized, handheld, computer-built-in or in-vehicle mobile apparatus, which exchanges voice and/or data with a wireless access network. For example, the wireless terminal device may be a device such as a personal communications service (personal communication service, PCS) phone, a cordless telephone set, a session initiation protocol (session initiated protocol, SIP) phone, a wireless local loop (wireless local loop, WLL) station, or a personal digital assistant (personal digital assistant, PDA). The wireless terminal device may also be referred to as a system, a subscriber unit (subscriber unit), a subscriber station (subscriber station), a mobile station (mobile station), a mobile (mobile) console, a remote station (remote station), an access point (access point), a remote terminal (remote terminal) device, an access terminal (access terminal) device, a user terminal (user terminal) device, a user agent (user agent), or a user apparatus (user device). This is not limited in the embodiments of this application.

The network device in the embodiments of this application may be an access point, a base station, a device that is in an access network and that communicates with a wireless terminal device over an air interface by using one or at least two sectors, or another name. The network device may be used to perform conversion between a received over-the-air frame and an internet protocol (internet protocol, IP) packet, and used as a router between a wireless terminal device and remaining part of an access network. The remaining part of the access network may include an internet protocol (IP) communications network. The network device may also coordinate attribute management of the air interface. For example, the network device in the embodiments of this application may be an evolved network device (evolutional nodeB, eNB or e-NodeB) in an LTE system, a 5G base station in a 5G system (next generation system), or the like. This is not limited in the embodiments of this application.

The following describes some terms in this application to help a person skilled in the art have a better understanding.

Figure 4:
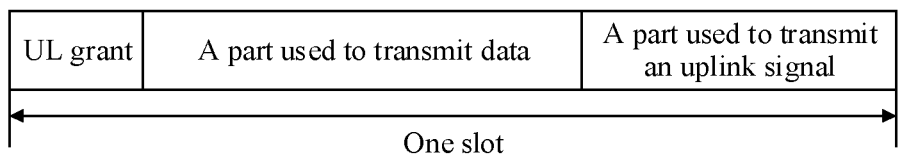
FIG. 4 is a schematic structural diagram of a slot resource according to an embodiment of this application.

A slot may be a basic unit used to form a physical channel, or may be a basic unit of a time domain resource. One slot may include at least two symbols. An uplink slot in a 5G system is used as an example. One uplink slot may be divided into three parts. A first part may be used to transmit an uplink grant (uplink grant, UL grant), a second part may be used to transmit data, and a third part may be used to transmit an uplink signal. For example, the third part of the uplink slot in the 5G system may be used to transmit an SRS, a PUCCH, a signal used for random access, or the like, as shown in FIG. 4.

A symbol is a time domain symbol included in a slot, and the time domain symbol may be briefly referred to as a "symbol". The symbol includes but is not limited to an orthogonal frequency division multiplexing (Orthogonal Frequency Division Multiplexing, OFDM) symbol, a sparse code multiplexing access technology (Sparse Code Multiplexing Access, SCMA) symbol, a filtered orthogonal frequency division multiplexing (Filtered Orthogonal Frequency Division Multiplexing, F-OFDM) symbol, a non-orthogonal multiple access (Non-Orthogonal Multiple Access, NOMA) symbol, and the like. This is not limited in the embodiments.

The term "at least two" is two or more.

In addition, it should be understood that, in the description of the embodiments of this application, terms such as "first" and "second" are merely used for the purpose of differentiation, and cannot be understood as indicating or suggesting relative importance, or understood as indicating or suggesting a sequence.

The following further describes the embodiments of this application in detail with reference to the accompanying drawings.

Figure 5:
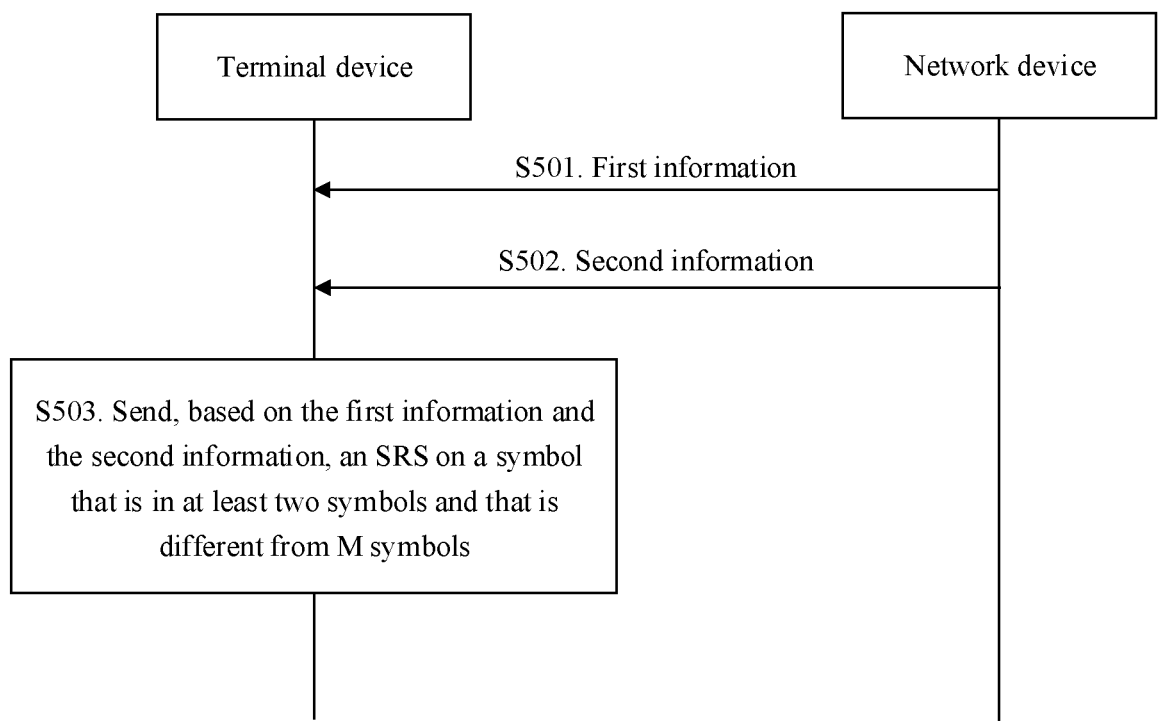
FIG. 5 is a schematic flowchart of an uplink signal transmission method 1 according to an embodiment of this application.

To resolve a problem that a conflict easily occurs between a symbol used to transmit an SRS and a symbol used to transmit an uplink signal different from the SRS in a 5G system, an embodiment of this application provides an uplink signal transmission method, and the method is applicable to the 5G system. FIG. 5 is a schematic flowchart of an uplink signal transmission method. The method includes the following steps.

S501. A terminal device receives first information sent by a network device.

In S501, the first information may be used to instruct the terminal device to send an SRS in an uplink signal on at least two consecutive symbols in a first slot, and there may be one or at least two first slots.

In S501, the SRS is an SRS in the 5G system. There are a plurality of methods in which the terminal device receives the first information sent by the network device, and this is not limited in this embodiment. In a possible implementation, the terminal device receives a system configuration message sent by the network device, and the system configuration message carries the first information. In a possible implementation, the system configuration message may include configuration information used to send the SRS, and the configuration information includes the first information. After receiving the configuration information, the terminal device configures, based on the configuration information, a time-frequency resource used when the terminal device periodically sends the SRS to the network device. When the SRS is used for channel detection, the configuration information includes but is not limited to a start frequency-domain position, the first slot, a symbol occupied by the SRS in one slot, a start symbol occupied by the SRS in one slot, an end symbol occupied by the SRS in one slot, a frequency domain position occupied by the SRS on each symbol, a period, and a code domain sequence. Alternatively, when the SRS is used for beam traversal, the configuration information includes but is not limited to a frequency domain position, the first slot, a symbol occupied by the SRS in one slot, and a start beam identifier.

For example, assuming that the first information includes a first slot T, n symbols occupied by the SRS in one slot, and a period t, when the terminal device receives the configuration information sent by the network device, the terminal device may determine to send the SRS to the network device on the n consecutive symbols in the first slot T, and to send the SRS to the network device on the n consecutive symbols in a slot that is separated from the first slot T by the period t.

S502. The terminal device receives second information sent by the network device.

In S502, the second information is used to instruct the terminal device not to send, on M symbols in the at least two consecutive symbols in the first slot, the SRS indicated in the first information. The M symbols are some or all of the at least two consecutive symbols in the first slot, and M is an integer greater than 0. The terminal device may determine, based on the second information, that the SRS is not sent on the M symbols.

That the second information is used to instruct the terminal device not to send, on the M symbols in the at least two consecutive symbols in the first slot, the SRS indicated in the first information may include the following two cases:

Case 1: When the network device determines that another terminal device sends, on the M symbols in the at least two consecutive symbols in the first slot, an uplink signal different from the SRS, because a conflict occurs, on the M symbols, between the uplink signal sent by the another terminal device and the SRS sent by the terminal device in S501, the network device sends second information to the terminal device, and the second information is used to instruct the terminal device not to send, on the M symbols in the at least two consecutive symbols in the first slot, the SRS indicated in the first information.

Case 2: When symbols that are allocated by the network device to the terminal device in S501 and that are used to send the uplink signal different from the SRS are M symbols in the at least two consecutive symbols in the first slot, because a conflict occurs, on the M symbols, between the SRS sent by the terminal device and the uplink signal different from the SRS, the network device sends second information to the terminal device, and the second information may be specifically that the terminal device sends another uplink signal different from the SRS on the M symbols in the at least two consecutive symbols in the first slot.

It should be noted that in this embodiment, the terminal device may perform S501 before S502, or may perform S502 before S501, or may simultaneously perform S501 and S502. This is not limited in this embodiment.

S503. After receiving the first information and the second information that are sent by the network device, the terminal device sends, based on the first information and the second information, the SRS on symbols that is in the at least two symbols and that is different from the M symbols.

In S503, after receiving the first information and the second information that are sent by the network device, the terminal device may determine, based on the first information, that the terminal device needs to send the SRS on the at least two consecutive symbols in the first slot, and the at least two symbols include the foregoing M symbols; and the terminal device may determine, based on the second message, not to send the SRS on the M symbols in the at least two symbols. Therefore, the terminal device sends the SRS on the symbol that is in the at least two symbols and that is different from the M symbols, resolving the problem that a conflict easily occurs between a symbol that is allocated to the terminal device and that is used to transmit the SRS and a symbol used to transmit the another uplink signal different from the SRS.

In an implementation, when the terminal device sends the SRS on the symbol that is in the at least two symbols and that is different from the M symbols in S503, and a conflict occurs, on the M symbols in the at least two consecutive symbols in the first slot, between the SRS sent by the terminal device and the uplink signal different from the SRS, the terminal device may send the SRS to the network device at a first power on the symbol that is in the at least two symbols and that is different from the M symbols in S503, and send the SRS to the network device at a second power on the M symbols in the at least two symbols. The second power is less than the first power, and the first power is an original power for sending the SRS. Alternatively, in S503, the terminal device may send the SRS to the network device at a first power on the symbol that is in the at least two symbols and that is different from the M symbols, and send the another uplink signal different from the SRS to the network device at a second power on the M symbols in the at least two symbols. The second power is less than the first power, and the first power is an original power for sending the SRS. Because the SRS and the another uplink signal different from the SRS that are sent by the terminal device on the M symbols of the at least two consecutive symbols in the first slot are located on different frequency domain resources, the terminal device may allocate some powers to the uplink signal, and a remaining power may be used to transmit the SRS. The network device performs channel detection or beam traversal based on the received SRS sent by the terminal device on the M symbols and a decrease value of the second power relative to the first power. Optionally, the terminal device sends, in a frequency domain position used to send the SRS on the M symbols indicated in the first information, the uplink signal that is different from the SRS and that is indicated in the second information. Optionally, the terminal device sends, by using a beam identifier used to send the SRS on the M symbols indicated in the first information, the uplink signal that is different from the SRS and that is indicated in the second information. On a receiving side, the network device may perform channel detection or beam traversal based on the uplink signal that is different from the SRS and that is received on the M symbols.

Figure 6A:
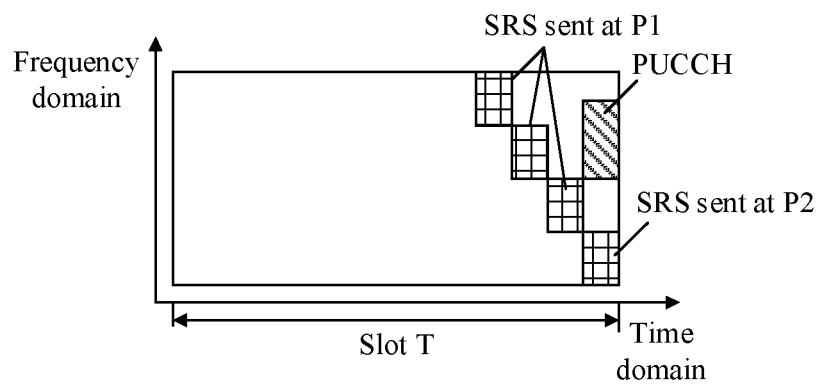
FIG. 6A is a schematic diagram of a scenario 1 in which an SRS of a 5G system is transmitted according to an embodiment of this application.

For example, for an SRS used for channel detection, as shown in FIG. 6A, it is assumed that the first slot is a slot T, the first power is P1, the second power is P2, P1 is greater than P2, and the M symbols in the at least two consecutive symbols in the first slot are the last symbol in four consecutive symbols in the slot T. After the terminal device receives the first information and the second information that are sent by the network device, in S503, the terminal device may send the SRS to the network device at the first power by occupying different frequency domain positions on symbols that is different from the last symbol and that is in the four consecutive symbols in the slot T, and send the SRS to the network device at the second power on the last symbol in the four consecutive symbols in the slot T.

Figure 6B:
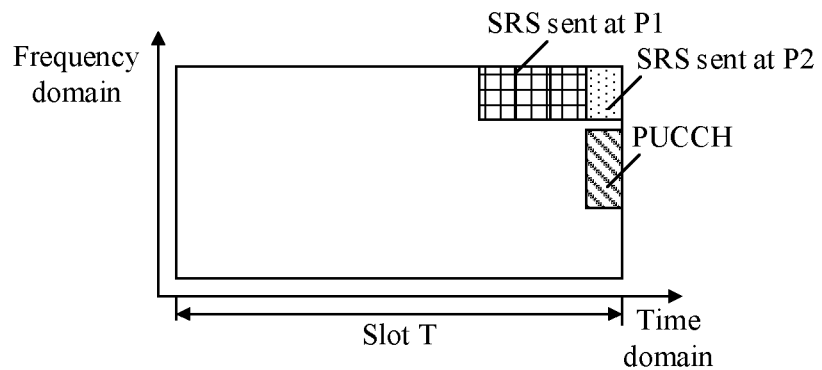
FIG. 6B is a schematic diagram of a scenario 2 in which an SRS of a 5G system is transmitted according to an embodiment of this application.

For example, for an SRS used for beam traversal, as shown in FIG. 6B, it is assumed that the first slot is a slot T, the first power is P1, the second power is P2, P1 is greater than P2, and the M symbols in the at least two consecutive symbols in the first slot are the last symbol in four consecutive symbols in the slot T. After the terminal device receives the first information and the second information that are sent by the network device, in S503, the terminal device sends, to the network device, the SRS at the first power by using different beams on a symbol that is different from the last symbol and that is in the four consecutive symbols in the slot T, and sends, to the network device, the SRS at the second power on the last symbol in the four consecutive symbols in the slot T by using a beam corresponding to the symbol.

Further, after the terminal device sends the SRS to the network device at the second power on the M symbols in the at least two symbols, the terminal device may further send a notification message to the network device, and the notification message is used by the network device to determine that a transmit power of the terminal device on the M symbols in the at least two symbols is the second power, so that the network device can accurately perform channel detection or beam traversal based on the second power indicated in the notification message and the received SRS sent at the second power. The notification message may be used to indicate that the transmit power at which the terminal device sends the SRS on the M symbols in the at least two symbols is the second power. The notification message may alternatively be used to indicate a difference between the second power and the first power. This is not limited in this embodiment.

In an implementation, because the terminal device sends the SRS on the symbol that is in the at least two symbols and that is different from the M symbols in S503, there is a case in which the terminal device does not send the SRS on the M symbols. In this case, to enable the network device to perform channel detection or beam traversal based on the received SRS, after the terminal device sends the SRS on the symbol that is in the at least two symbols and that is different from the M symbols in S503, the terminal device may further receive scheduling information sent by the network device, and the scheduling information is used to schedule the terminal device to send the SRS in a second slot that follows the first slot. The SRS sent in the second slot is a subset of the SRS that is indicated in the first information and that is sent on the at least two symbols. In other words, the SRS sent in the second slot may be a part of or all of the SRS that is indicated in the first information and that is sent in the at least two symbols. Further, the SRS sent in the second slot includes the SRS that is not sent on the M symbols. Further, the scheduling information further includes that the SRS sent in the second slot includes the SRS that is not sent in the M symbols, and/or the symbol occupied when the terminal device is scheduled to send the SRS in the second slot.

Figure 7A:
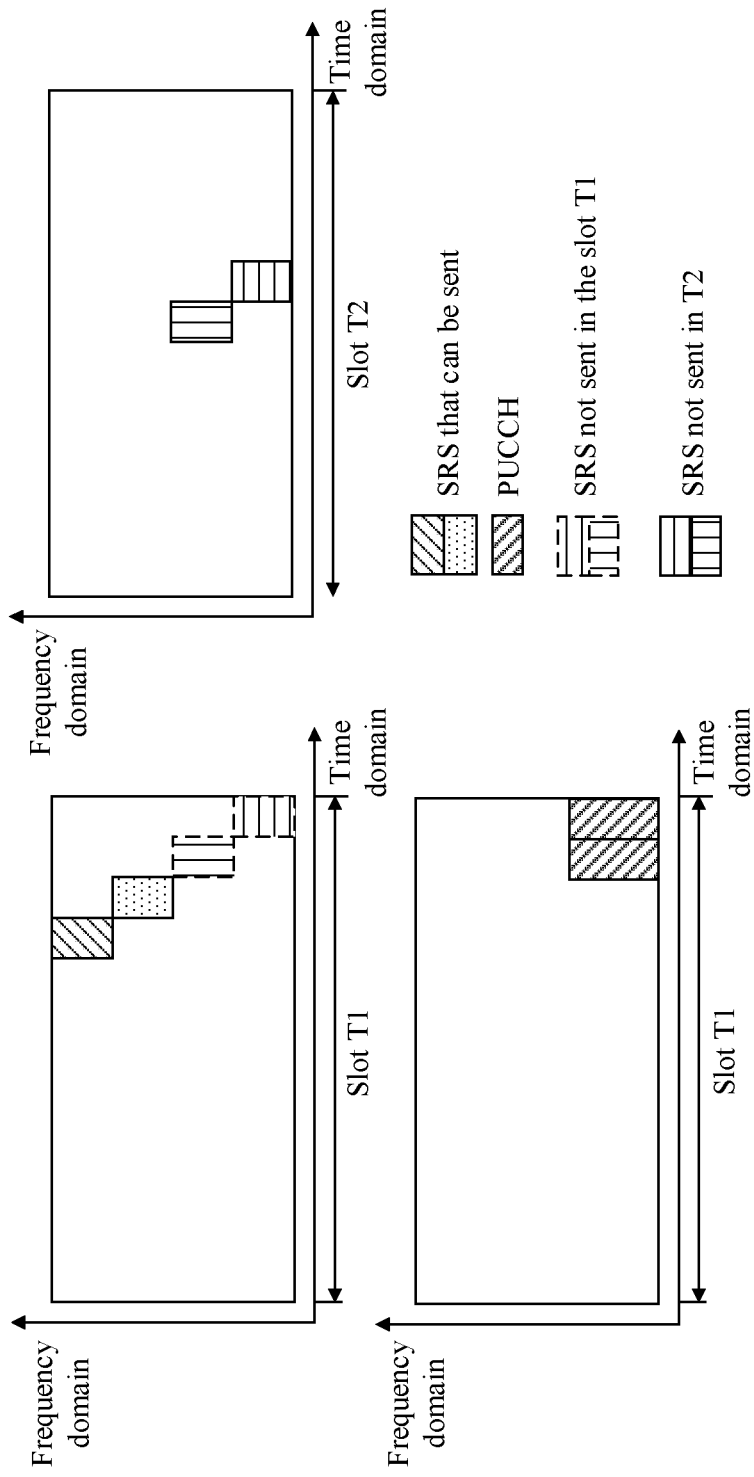
FIG. 7A is a schematic diagram of a scenario 3 in which an SRS of a 5G system is transmitted according to an embodiment of this application.

When the SRS is used for channel detection, after the terminal device receives the scheduling information sent by the network device, the terminal device sends, based on the scheduling information, the SRS in a specified frequency domain position in the second slot that follows the first slot, and/or the scheduling information indicates the symbol occupied when the terminal device is scheduled to send the SRS in the second slot. The specified frequency domain position may be a corresponding frequency domain position in which the SRS is not sent by the terminal device on the M symbols in the first slot. Therefore, the network device can complete the channel detection for the frequency domain position in which the SRS is not sent in the first slot, so that a time used by the network device to complete a current channel detection process can be shortened. For example, as shown in FIG. 7A, it is assumed that the first slot is a slot T1, the second slot is a slot T2, the M symbols in the at least two consecutive symbols in the first slot are the last two symbols in four consecutive symbols in the slot T1, and the terminal device does not send, in the slot T1, the SRS on the last two symbols in the four consecutive symbols in the slot T1. In this case, the terminal device may receive scheduling information sent by the network device, and send, in the slot T2 based on the scheduling information, the SRS to the network device in a specified frequency domain position, and/or the scheduling information indicates a symbol occupied when the terminal device is scheduled to send the SRS in the slot T2.

When the SRS is used for beam traversal, after the terminal device receives the scheduling information sent by the network device, the terminal device sends, based on the scheduling information, the SRS on a specified beam in the second slot that follows the first slot, and/or the scheduling information indicates the symbol occupied when the terminal device is scheduled to send the SRS in the second slot. The specified beam may be a corresponding beam on which the SRS is not sent on the M symbols in the first slot. According to the foregoing method, the network device can receive, in the second slot, the SRS that is sent by the terminal device on the corresponding beam on which the SRS is not sent in the first slot, so that the network device can complete traversal of the corresponding beam on which the SRS is not sent in the first slot, and then a time used by the network device to complete a current beam traversal process can be shortened.

Figure 7B:
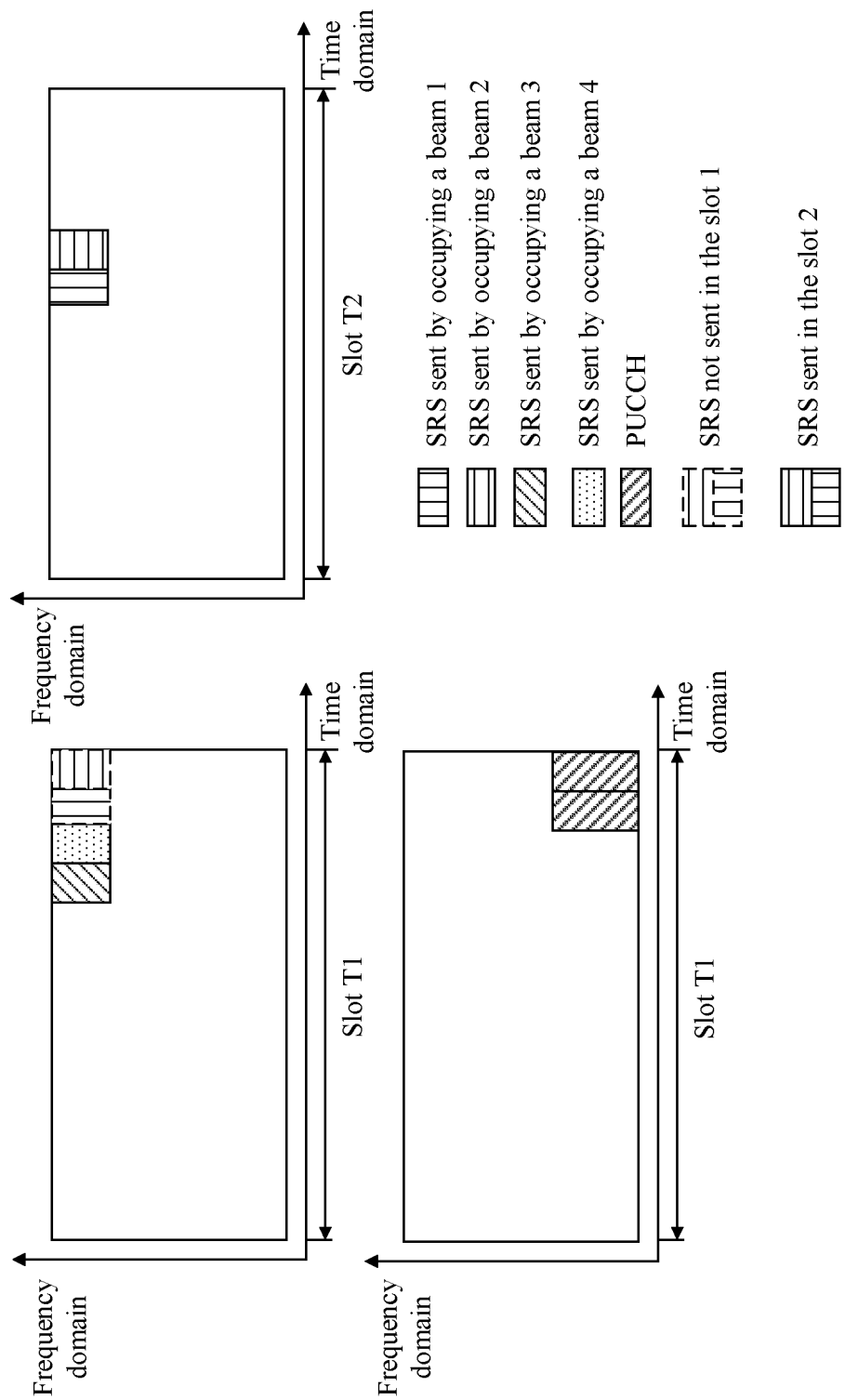
FIG. 7B is a schematic diagram of a scenario 4 in which an SRS of a 5G system is transmitted according to an embodiment of this application.

For example, as shown in FIG. 7B, it is assumed that the first slot is the slot T1, the second slot is the slot T2, the M symbols in the at least two consecutive symbols in the first slot are the last two symbols in four consecutive symbols in the slot T1, the terminal device does not send, in the slot T1, the SRS in the last two symbols in the four consecutive symbols in the slot T1, and corresponding beams on which the SRS is not sent are a beam 1 and a beam 2. In this case, the terminal device may receive scheduling information sent by the network device, and send, in the slot T2 based on the scheduling information, the SRS to the network device on the beam 1 and the beam 2, and/or the scheduling information indicates a symbol occupied when the terminal device is scheduled to send the SRS in the slot T2.

According to the uplink signal transmission method provided in this embodiment of this application, the terminal device receives the first information that is sent by the network device and that is used to instruct the terminal device to send the SRS on the at least two symbols in the first slot, and the second information that is sent by the network device and that is used to instruct the terminal device not to send the SRS on the M symbols in the at least two symbols, where M is an integer greater than 0. The terminal device sends, based on the received first information and the received second information, the SRS on the symbol that is in the at least two symbols and that is different from the M symbols. According to the foregoing method, a case in which the SRS and the another uplink signal are sent by the terminal device on the M symbols in the at least two symbols in the first slot can be avoided, so that the conflict that occurs between the symbol used to transmit the SRS and the symbol used to transmit the another uplink signal in the 5G system can be avoided.

Figure 8:
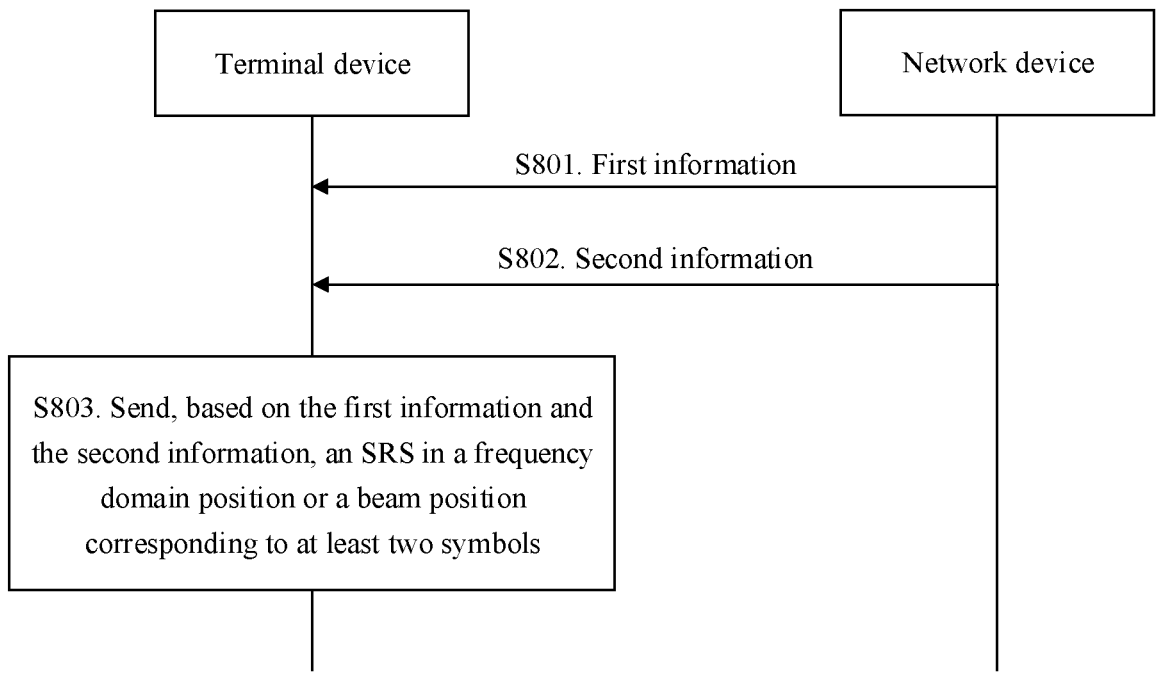
FIG. 8 is a schematic flowchart of an uplink signal transmission method 2 according to an embodiment of this application.

To resolve a problem that a conflict easily occurs between a symbol used to transmit an SRS and a symbol used to transmit an uplink signal different from the SRS in a 5G system, an embodiment of this application further provides an uplink signal transmission method, and the method is applicable to the 5G system. FIG. 8 is a schematic flowchart of an uplink signal transmission method, and the method includes the following steps.

S801. A terminal device receives first information sent by a network device.

In S801, the first information may be used to instruct the terminal device to send an SRS in an uplink signal on at least two consecutive symbols in a slot.

In S801, the SRS is an SRS in the 5G system. There are a plurality of methods in which the terminal device receives the first information sent by the network device, and this is not limited in this embodiment. In a possible implementation, the terminal device receives a system configuration message sent by the network device, and the system configuration message carries the first information. In a possible implementation, the system configuration message may include configuration information used to send the SRS, and the configuration information includes the first information. After receiving the configuration information, the terminal device configures, based on the configuration information, a time-frequency resource used when the terminal device periodically sends the SRS to the network device. When the SRS is used for channel detection, the configuration information includes but is not limited to a start frequency-domain position, the first slot, a symbol occupied by the SRS in one slot, a start symbol occupied by the SRS in one slot, an end symbol occupied by the SRS in one slot, a frequency domain position occupied by the SRS on each symbol, a period, and a code domain sequence. Alternatively, when the SRS is used for beam traversal, the configuration information includes but is not limited to a frequency domain position, the first slot, a symbol occupied by the SRS in one slot, and a start beam identifier.

It should be noted that the first information in the method shown in FIG. 8 is similar to the first information in the method shown in FIG. 5. Referring to the related description of the first information in the method shown in FIG. 5, details are not described herein again.

S802. The terminal device receives second information sent by the network device.

In S802, the second information may be used to determine a frequency domain position or a beam identifier occupied when the terminal device sends the SRS.

The second information is used to indicate a frequency domain offset value of the SRS, and the frequency domain offset value is used to determine a frequency domain position obtained after frequency domain offset is performed. The frequency domain position obtained after the frequency domain offset is performed is obtained by adding the frequency domain offset value to a frequency domain position obtained before the frequency domain offset is performed. Alternatively, the second information is used to indicate a beam offset value of the SRS, and the beam offset value is used to determine a beam identifier obtained after beam offset is performed. The beam identifier obtained after the beam offset is performed is obtained by adding the beam offset value to a beam identifier obtained before the beam offset is performed. The method for determining, by the terminal device based on the frequency domain offset, the frequency domain position occupied when the terminal device sends the SRS, and the method for determining, by the terminal device based on the beam offset, the beam identifier occupied when the terminal device sends the SRS are described in detail in S803. Details are not described herein again.

It should be noted that the second information in the method shown in FIG. 8 may further include the second information in the method shown in FIG. 5, or the second information in the method shown in FIG. 5 may further include the second information in the method shown in FIG. 8. S802 may be performed before S801, may be performed after S801, or may be performed simultaneously with S801, which is not limited in this embodiment.

S803. After receiving the first information and the second information that are sent by the network device, the terminal device sends, based on the first information and the second information, the SRS in the frequency domain position corresponding to the at least two symbols or on the beam identifier corresponding to the at least two symbols.

The following separately describes S803 by using two cases: The second information is used to determine the frequency domain position occupied when the terminal device sends the SRS; and the second information is used to determine the beam identifier occupied when the terminal device sends the SRS.

Case 1: The second information is used to determine the frequency domain position occupied when the terminal device sends the SRS.

In this case, the second information may be used to indicate a frequency domain offset value of the SRS, and the frequency domain offset value is used by the terminal device to determine a frequency domain position obtained after frequency domain offset is performed. The frequency domain position obtained after the frequency domain offset is performed is obtained by adding the frequency domain offset value to a frequency domain position obtained before the frequency domain offset is performed.

In S803, the terminal device sends, based on the first information and the second information, the SRS on the at least two symbols in each period from a next period of sending the SRS, and a frequency domain position used when the SRS is sent in each period is obtained by adding the frequency domain offset value to a frequency domain position for sending the SRS in a previous period, In this way, a case in which the terminal device sends the SRS each time in a same frequency domain position in which a conflict occurs can be avoided in each period from the next period of sending the SRS, and then a possibility that a conflict occurs between a symbol used to transmit the SRS and a symbol used to transmit the another uplink signal in the 5G system can be reduced. In addition, in comparison with an existing channel detection process, the frequency domain position occupied when the terminal device sends the SRS on the at least two symbols in each period from the next period of sending the SRS is obtained after frequency domain offset is performed for the frequency domain position in the previous period. Therefore, if there is a conflict on some symbols in a period, another conflict on these symbols is avoided in a next period because different frequency domain positions are caused by frequency domain offset, so that a time used by the network device to complete channel detection is shortened.

Figure 9A:
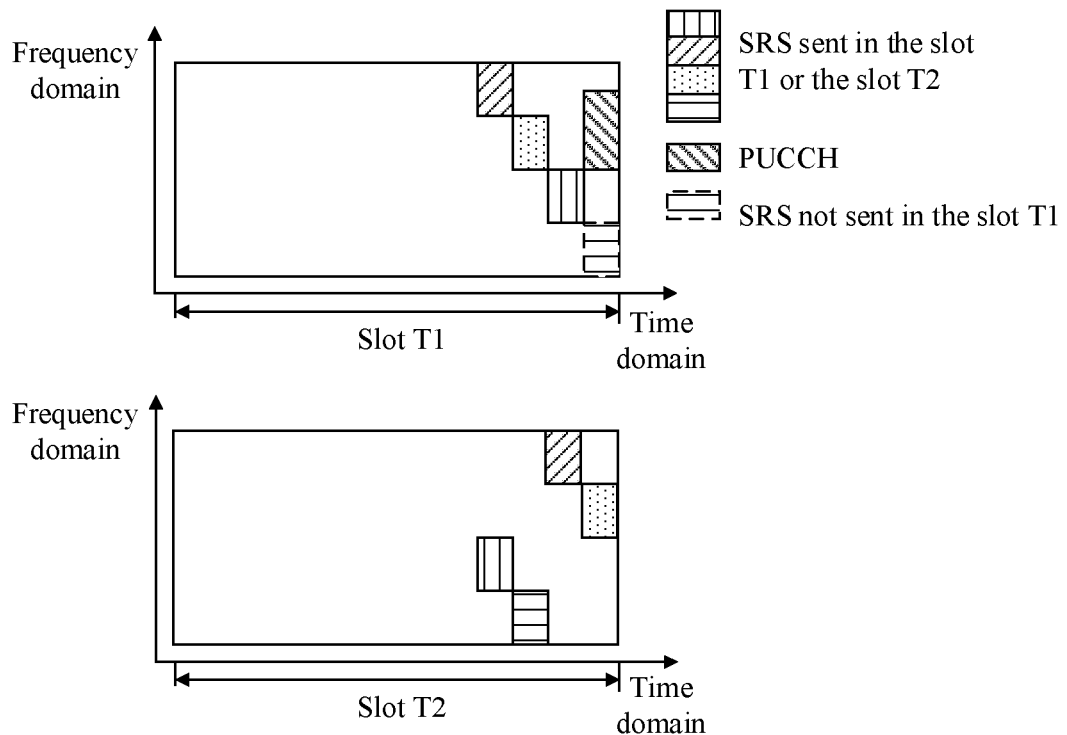
FIG. 9A is a schematic diagram of a scenario 5 in which an SRS of a 5G system is transmitted according to an embodiment of this application.

For example, as shown in FIG. 9A, it is assumed that a frequency domain offset value is half of a frequency band, the upper figure in FIG. 9A shows a current period of sending the SRS, and the lower figure in FIG. 9A shows a next period of the current period of sending the SRS. In the upper figure in FIG. 9A, the terminal device sends the SRS on four consecutive symbols in a slot T1 by sequentially occupying the first quarter of an entire frequency band, the second quarter of the entire frequency band, the third quarter of the entire frequency band and the last quarter of the entire frequency band. The terminal device determines, based on the frequency domain offset value in the lower figure in FIG. 9A, that the terminal device sends the SRS on four consecutive symbols in a slot T2 in the next period of sending the SRS by sequentially occupying the third quarter of an entire frequency band, the last quarter of the entire frequency band, the first quarter of the entire frequency band, and the second quarter of the entire frequency band. By analogy, on the last but two symbols in the slot T2, the terminal device may send the SRS on the first quarter of the entire frequency band.

Case 2: The second information is used to determine the beam identifier occupied when the terminal device sends the SRS.

In this case, the second information may be used to indicate a beam offset value of the SRS, and the beam offset value is used by the terminal device to determine a beam identifier obtained after beam offset is performed. The beam identifier obtained after the beam offset is performed is obtained by adding the beam offset value to a beam identifier obtained before the beam offset is performed.

In S803, the terminal device sends, based on the first information and the second information, the SRS on the at least two symbols in each period from a next period of sending the SRS, and a beam identifier used when the SRS is sent in each period is obtained by adding the beam offset value to a beam identifier for sending the SRS in a previous period. Therefore, a case in which the terminal device sends the SRS each time on a same beam identifier on which a conflict occurs can be avoided in each period from the next period of sending the SRS, and then a possibility that a conflict occurs between a symbol used to transmit the SRS and a symbol used to transmit the another uplink signal in the 5G system can be reduced. In comparison with an existing beam traversal process, the beam occupied when the terminal device sends the SRS on the at least two symbols in each period from the next period of sending the SRS is obtained after beam offset is performed for the beam in the previous period. Therefore, if there is a conflict on some symbols in a period, another conflict on these symbols is avoided in a next period because different beam identifiers are caused by beam offset, so that a time used by the network device to complete beam traversal is shortened.

Figure 9B:
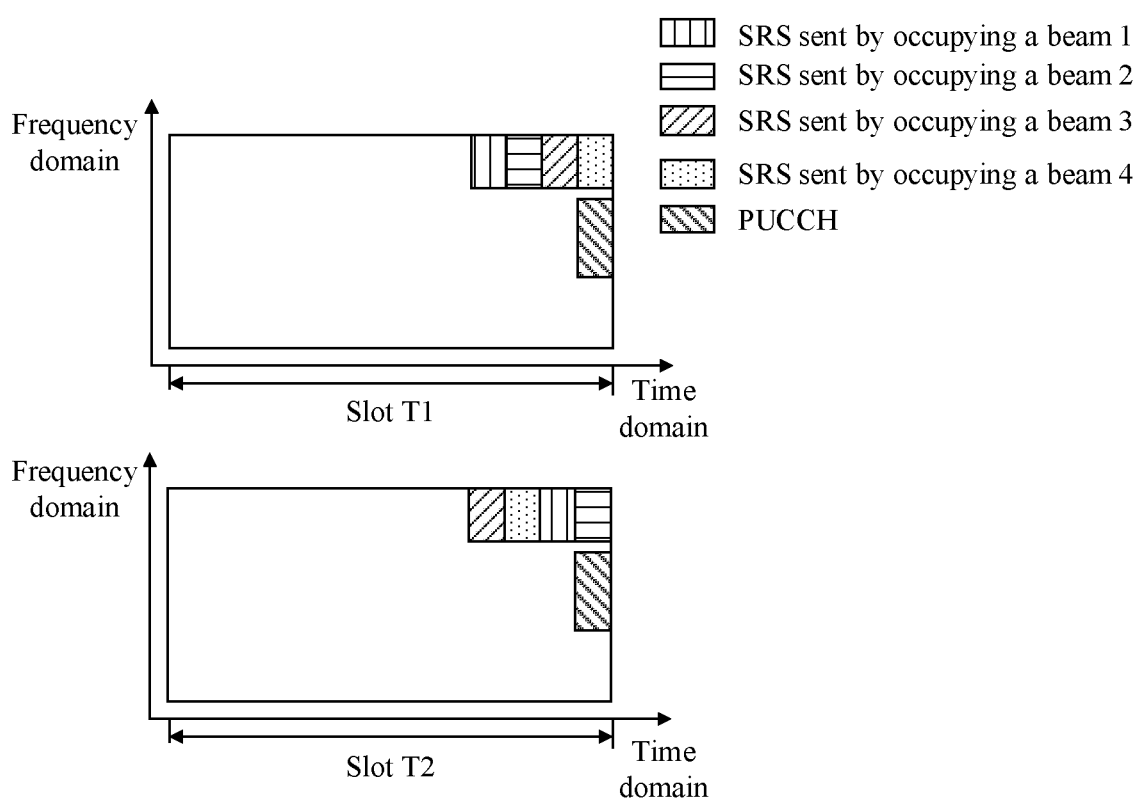
FIG. 9B is a schematic diagram of a scenario 6 in which an SRS of a 5G system is transmitted according to an embodiment of this application.

For example, as shown in FIG. 9B, it is assumed that a beam offset value is 2, the upper figure in FIG. 9B shows a current period of sending the SRS, and the lower figure in FIG. 9B shows a next period of the current period of sending the SRS. In the upper figure in FIG. 9B, the terminal device sends the SRS on four consecutive symbols in a slot T1 by sequentially occupying four beams with beam numbers of 1, 2, 3 and 4. The terminal device determines, based on the beam offset value, that in the lower figure in FIG. 9B, the terminal device sends the SRS on four consecutive symbols in a slot T2 in the next period of sending the SRS by sequentially occupying four beams with beam numbers of 3, 4, 1 and 2. By analogy, the terminal device may send the SRS on the beam 3 in the last but three symbols in the slot T2, and the terminal device may send the SRS on the beam 4 in the last but two symbols in the slot T2, so that the network device can complete beam traversal between the beam 3 and the beam 4.

In a possible implementation, the terminal device sends, based on the first information and the second information, the SRS on a symbol that is in the at least two symbols indicated by the first information in the current period and that is different from a symbol on which a conflict occurs, and does not send the SRS on a symbol, in the at least two symbols, on which a conflict occurs. This implementation is similar to S503 in the method shown in FIG. 5. For this implementation, refer to the related description of S503 in the method shown in FIG. 5. Details are not described herein again.

In the uplink signal transmission method according to this embodiment of this application, the terminal device receives the first information that is sent by the network device and that is used to instruct the terminal device to send the sounding reference signal SRS on the at least two symbols in a slot, and the second information that is sent by the network device and that is used to determine the frequency domain position or the beam identifier occupied when the terminal device sends the SRS, and the terminal device sends, based on the received first information and the received second information, the SRS in the frequency domain position corresponding to the at least two symbols or on the beam identifier corresponding to the at least two symbols. According to the foregoing method, a case in which the terminal device sends the SRS each time in a same frequency domain position in which a conflict occurs or on a same beam identifier on which a conflict occurs can be avoided, and then a possibility that a conflict occurs between a symbol used to transmit the SRS and a symbol used to transmit the another uplink signal in the 5G system can be reduced.

It should be noted that the uplink signal transmission method shown in FIG. 8 and the uplink signal transmission method shown in FIG. 5 are parallel methods. Both methods can be used to resolve the problem that a conflict easily occurs between a symbol used to transmit an SRS and a symbol used to transmit a PUCCH in the 5G system.

In some cases, a time-frequency domain resource used by a terminal in a cell 1 to send an uplink signal is the same as a resource used by a terminal device in a cell 2 to send an SRS. Consequently, interference caused. For a processing method, refer to the foregoing manner. A network device sends indication information to the terminal device in the cell 2 to instruct the terminal device in the cell 2 not to send the SRS on the time-frequency domain resource, or instruct the terminal device in the cell 2 to send the SRS in another time-frequency domain position. In another manner, the network device sends indication information to the terminal device in the cell 1 to instruct the terminal device not to send the uplink signal on the time-frequency domain resource, or instruct the terminal device to send the uplink signal in another time-frequency domain position. The cell 1 and the cell 2 may be the same or different.

Figure 10:
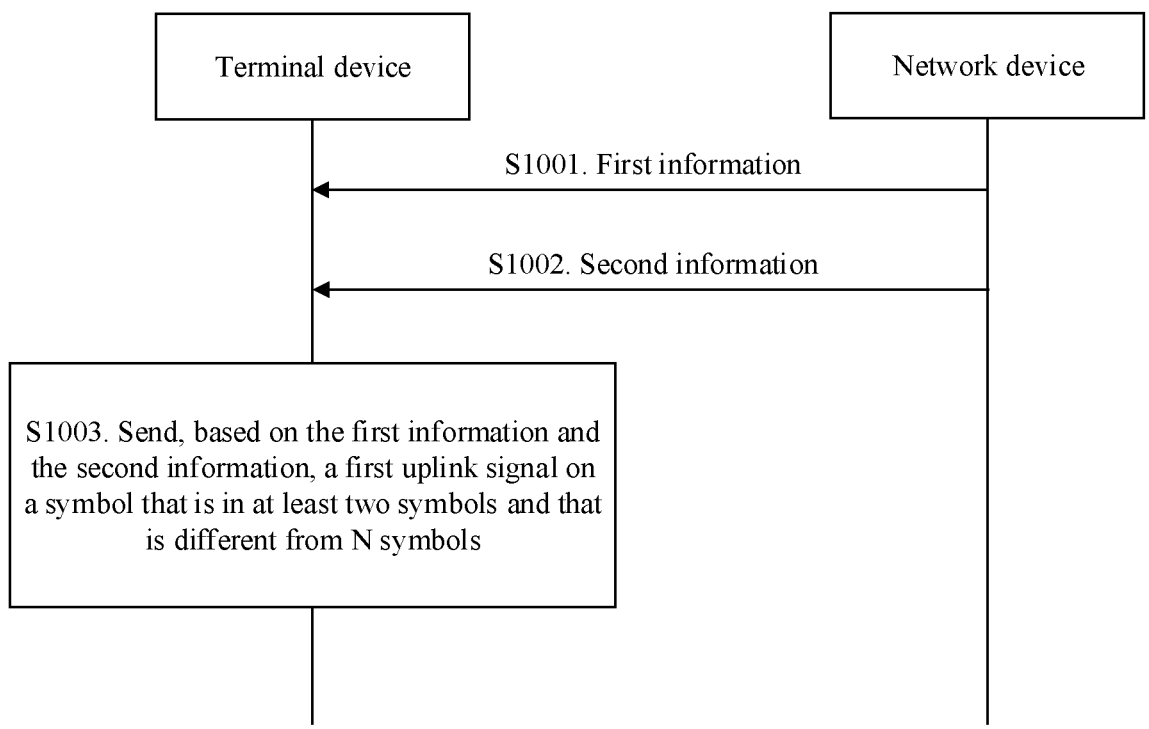
FIG. 10 is a schematic flowchart of an uplink signal transmission method 3 according to an embodiment of this application.

To resolve the problem that a conflict easily occurs between a symbol used to transmit the SRS in the LTE system and a symbol used to transmit the uplink signal in the 5G system in a scenario in which the 5G system and the LTE system coexist, an embodiment of this application further provides an uplink signal transmission method. The method is applicable to the scenario in which the 5G system and the LTE system coexist. In the method, a first system may be the 5G system, and a second system may be the LTE system. FIG. 10 is a schematic flowchart of an uplink signal transmission method, and the method includes the following steps.

S1001. A terminal device receives first information sent by a network device.

In S1001, the first information may be used to instruct the terminal device to send a first uplink signal of a first system on at least two symbols in a slot. The first system may be a 5G system, and the first uplink signal includes one or at least two of the following signals: an SRS, a PUCCH, and an uplink signal used for random access in the 5G system.

In S1001, there may be a plurality of methods in which the terminal device receives the first information sent by the network device, and this is not limited in this embodiment. In a possible implementation, the terminal device receives a system configuration message sent by the network device, and the system configuration message carries the first information. In a possible implementation, the system configuration message may further include configuration information used to send the first uplink signal, and the configuration information includes the first information. After receiving the configuration information, the terminal device configures, based on the configuration information, a time-frequency resource used when the terminal device periodically sends the first uplink signal to the network device. The configuration information includes but is not limited to a start frequency-domain position, a symbol occupied by the first uplink signal in one slot, a frequency domain position occupied by the first uplink signal on each symbol, a period, and a code domain sequence. Alternatively, the configuration information includes but is not limited to a frequency domain position, a symbol occupied by the first uplink signal in one slot, a start beam identifier, a period, and a code domain sequence.

Figure 11A:
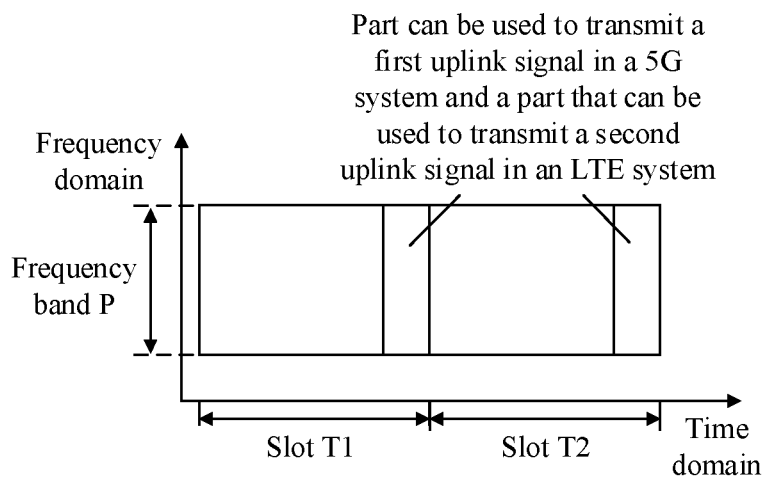
FIG. 11A is a schematic structural diagram of a scenario in which an LTE system and a 5G system coexist according to an embodiment of this application.
Figure 11B:
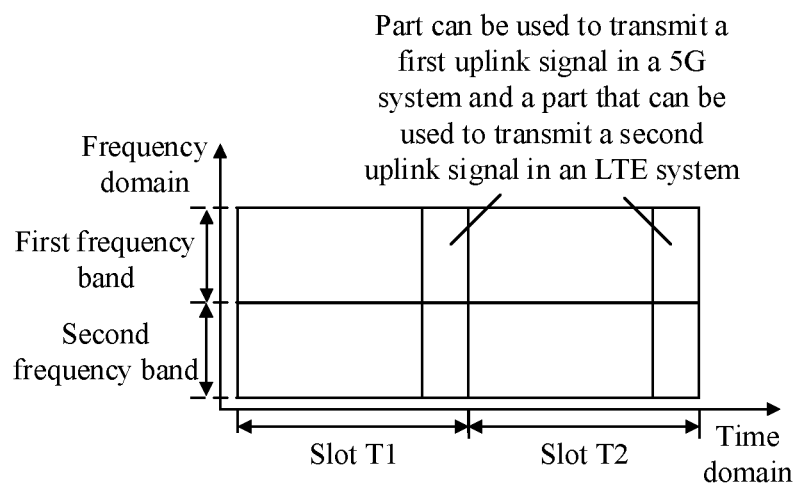
FIG. 11B is a schematic structural diagram of another scenario in which an LTE system and a 5G system coexist according to an embodiment of this application.

In a scenario in which the 5G system and an LTE system coexist, the LTE system and the 5G system may jointly occupy a single frequency band. As shown in FIG. 11A, the LTE system and the 5G system jointly occupy a frequency band P in a slot T1 and a slot T2. Alternatively, an LTE system and the 5G system may jointly occupy at least two frequency bands. As shown in FIG. 11B, the LTE system and the 5G system jointly occupy a first frequency band and a second frequency band in a slot T1 and a slot T2.

Further, when the LTE system and the 5G system jointly occupy at least two frequency bands, the first information may be used to indicate that the terminal device sends, on some or all of the at least two frequency bands jointly occupied by the LTE system and the 5G system, the first uplink signal of the first system on the at least two symbols in a slot.

S1002. The terminal device receives second information sent by the network device.

In S1002, the second information is used to indicate that a second uplink signal of a second system occupies N symbols in the at least two symbols in a slot, and N is an integer greater than 0. The second system may be the LTE system, and the second uplink signal includes one or at least two of the following signals: an SRS in the LTE system, a PUCCH in the LTE system, and an uplink signal used for random access in the LTE system. For example, the second information may be used to indicate that the SRS in the LTE system occupies one of three symbols in a slot, and the terminal device sends the first uplink signal in the 5G system on the three symbols in the slot.

Further, when the LTE system and the 5G system jointly occupy at least two frequency bands, the second information may be further used to indicate that the terminal device sends, on some or all of the at least two frequency bands jointly occupied by the LTE system and the 5G system, the second uplink signal of the second system on a symbol in a slot. In implementation, the indication may be implemented by using several-bit information in the second information, and the second information indicates that the terminal device sends the second uplink signal of the second system on a symbol in a slot. The indication is applicable to indicating a frequency band of the at least two frequency bands jointly occupied by the LTE system and the 5G system.

Further, when the LTE system and the 5G system jointly occupy a single frequency band, the second information may be specifically used to indicate that the second uplink signal of the second system occupies N symbols in at least two symbols in a current slot or a slot that follows the current slot, and the current slot is a slot in which the terminal device receives the second information. For example, the second information may be specifically used to indicate that the second uplink signal of the second system occupies N symbols in at least two symbols in a slot T or a slot that follows the slot T, and the slot T is a slot in which the terminal device receives the second information.

S1003. The terminal device sends, based on the first information and the second information, the first uplink signal on a symbol that is in the at least two symbols and that is different from the N symbols.

In S1003, that the terminal device sends, based on the first information and the second information, the first uplink signal on a symbol that is in the at least two symbols and that is different from the N symbols may include the following three cases.

Case 1: The terminal device sends all signals in the first uplink signal on the symbol that is in the at least two symbols in a slot and that is different from the N symbols.

In the case 1, the symbol that is in the at least two symbols in a slot and that is different from the N symbols may include a symbol before the N symbols in the slot, or a symbol after the N symbols in the slot, or a symbol before the N symbols in the slot and a symbol after the N symbols in the slot. The symbol that is in the at least two symbols in a slot and that is different from the N symbols may be preconfigured, or may be indicated by using indication information. This is not limited in this embodiment.

Figure 13A:
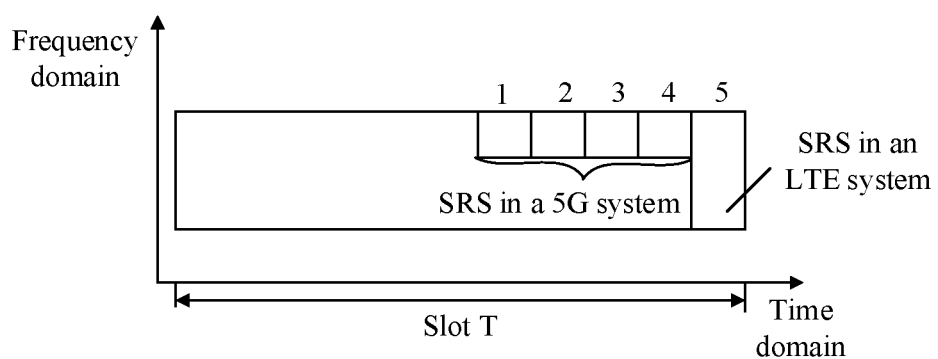
FIG. 13A is a schematic diagram of a scenario in which an SRS of a 5G system is transmitted in a scenario in which an LTE system and a 5G system coexist according to an embodiment of this application.

For example, as shown in FIG. 13A, it is assumed that the first information is used to instruct the terminal device to send the SRS in the 5G system on four symbols whose sequence numbers are 2 to 5 in a slot T, and the second information is used to indicate that the SRS in the LTE system occupies a symbol whose sequence number is 5 in the slot T. The terminal device determines, based on the first information and the second information, to send the SRS in the 5G system on four symbols whose sequence numbers are 1 to 4 in the slot T.

Case 2: The terminal device sends some signals in the first uplink signal on the symbol that is in the at least two symbols in a slot and that is different from the N symbols.

For example, FIG. 13A is still used as an example. It is assumed that the first information is used to instruct the terminal device to send the SRS in the 5G system on four symbols whose sequence numbers are 2 to 5 in a slot T, and the second information is used to indicate that the SRS in the LTE system occupies a symbol whose sequence number is 5 in the slot T. The terminal device determines, based on the first information and the second information, to send some signals of the SRS in the 5G system on three symbols whose sequence numbers are 2 to 4 in the slot T.

Case 3: The terminal device sends a third uplink signal of the second system on the N symbols.

In the case 3, the third uplink signal carries information or a function carried in the first uplink signal that is not sent on the N symbols, and the third uplink signal includes one or at least two of the following signals: an SRS in the LTE system, a PUCCH in the LTE system, and an uplink signal used for random access in the LTE system. In a possible implementation, the terminal device may send the third uplink signal of the second system in a frequency domain position that is not occupied by the second uplink signal of the second system.

Figure 13B:
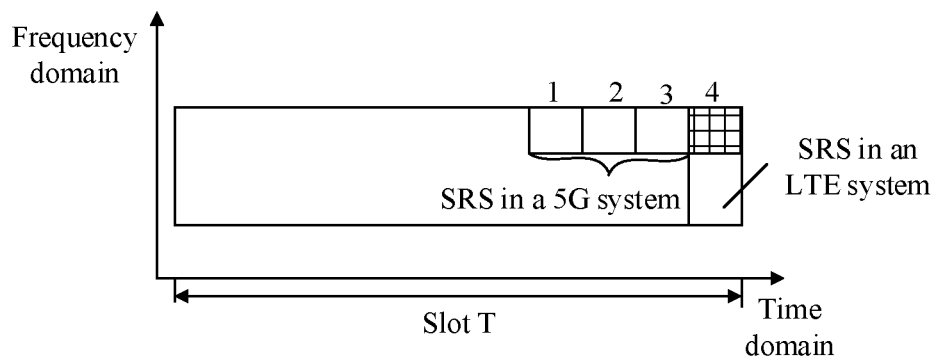
FIG. 13B is a schematic diagram of another scenario in which an SRS of a 5G system is transmitted in a scenario in which an LTE system and a 5G system coexist according to an embodiment of this application.

For example, as shown in FIG. 13B, it is assumed that the first information is used to instruct the terminal device to send the SRS in the 5G system on four symbols whose sequence numbers are 1 to 4 in a slot T, and the second information is used to indicate that the SRS in the LTE system occupies a symbol whose sequence number is 4 in the slot T. The terminal device determines, based on the first information and the second information, to send the SRS in the 5G system on three symbols whose sequence numbers are 1 to 3 in the slot T, and to send, on the symbol whose sequence number is 4, the SRS in the LTE system in a frequency domain position (grid part shown in FIG. 13B) that is not occupied by the SRS in the LTE system. The SRS in the LTE system carries information or a function carried in the SRS in the 5G system. The information carried in the SRS in the 5G system is information or a function carried in the SRS that is in the 5G system and that is not sent on the symbol whose sequence number is 4.

It should be noted that, a specific implementation of S1003 used when the uplink signal in the 5G system in the case 3 includes another uplink signal that is different from the SRS in the 5G system is similar to the specific implementation of S1003 used when the uplink signal in the 5G system in the case 3 includes the SRS in the 5G system. For details, refer to related descriptions in the specific implementation of S1003 used when the uplink signal in the 5G system in the case 3 includes the SRS in the 5G system. Details are not described herein again.

Figure 12:
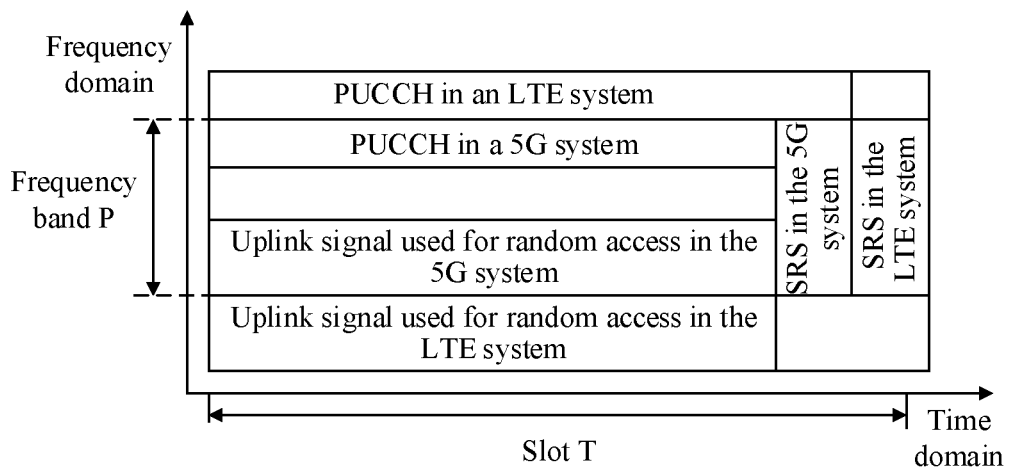
FIG. 12 is a schematic structural diagram of a frequency band resource according to an embodiment of this application.

In a possible implementation, in the first uplink signal of the first system, a frequency band covered by the SRS in the first uplink signal may include at least one of a frequency band covered by the PUCCH in the first uplink signal and a frequency band covered by the uplink signal used for random access in the first uplink signal. For example, as shown in FIG. 12, it is assumed that the first uplink signal of a 5G system includes an SRS, a PUCCH, and an uplink signal used for random access, and a frequency band P covered by the SRS in the first uplink signal may include a frequency band covered by the PUCCH in the first uplink signal and a frequency band covered by the uplink signal used for random access in the first uplink signal.

Optionally, a time domain resource of the uplink signal used for random access in the 5G system may be indicated in the following two manners: Manner 1: The network device notifies the terminal that the time domain resource used to send the uplink signal used for random access in the 5G system includes an indication of a symbol range, and the indication information may include at least one bit and indicates a quantity of symbols occupied by the time domain resource of the uplink signal used for random access in the 5G system, or a start symbol position of the time domain resource of the uplink signal used for random access in the 5G system, or an end symbol position of the time domain resource of the uplink signal used for random access in the 5G system. Manner 2: The network device notifies the terminal that the time domain resource of the uplink signal used for random access in the 5G system is determined by using a fixed value, for example, a quantity of symbols is 13. In this case, the terminal device transmits the uplink signal used for random access in the 5G system on the first symbol to the thirteenth symbol in a subframe in which the time domain resource exists.

In the uplink signal transmission method according to this embodiment of this application, the terminal device receives the first information that is sent by the network device and that is used to instruct the terminal device to send the first uplink signal of the first system on the at least two symbols in a slot, and the second information used to indicate that the second uplink signal of the second system occupies N symbols in the at least two symbols, where N is an integer greater than 0; and the terminal device sends, based on the first information and the second information, the first uplink signal on a symbol that is in the at least two symbols and that is different from the N symbols. According to the foregoing method, a case in which the uplink signal in the 5G system and the uplink signal in the LTE system appear simultaneously on the N symbols in a scenario in which the 5G system and the LTE system coexist can be avoided. Therefore, the problem that a conflict occurs between a symbol used to transmit the SRS in the LTE system and a symbol used to transmit the uplink signal in the 5G system in the scenario in which the 5G system and the LTE system coexist can be resolved.

It should be noted that, in the scenario in which the 5G system and the LTE system coexist, the uplink signal transmission method shown in FIG. 8 and the uplink signal transmission method shown in FIG. 5 may also be used to resolve the problem that a conflict easily occurs between a symbol used to transmit the SRS and a symbol used to transmit the PUCCH in the 5G system. The uplink signal transmission method shown in FIG. 10 may be combined with one of the uplink signal transmission method shown in FIG. 8 and the uplink signal transmission method shown in FIG. 5 to resolve the following two problems: The problem that a conflict occurs between a symbol used to transmit the SRS in the LTE system and a symbol used to transmit the uplink signal in the 5G system in this scenario, and the problem that a conflict easily occurs between a symbol used to transmit the SRS and a symbol used to transmit the PUCCH in the 5G system in this scenario.

Figure 14:
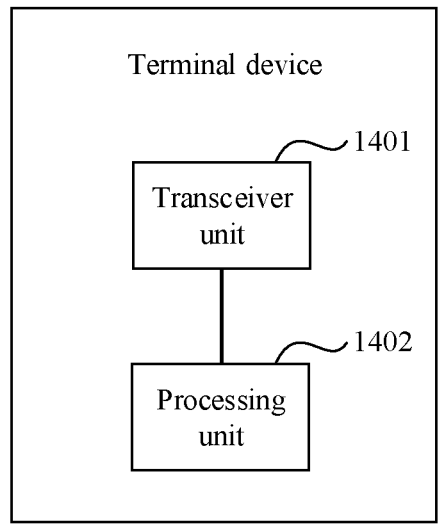
FIG. 14 is a schematic structural diagram of a terminal device according to an embodiment of this application.

Based on a same invention concept, an embodiment of this application further provides a terminal device, and the terminal device may implement the method performed by the terminal device in the method provided in the embodiment corresponding to FIG. 5. Referring to FIG. 14, the terminal device includes a transceiver unit 1401 and a processing unit 1402. The transceiver unit 1401 is configured to: receive first information sent by a network device, where the first information is used to instruct the terminal device to send a sounding reference signal SRS on at least two symbols in a first slot; and receive second information sent by the network device, where the second information is used to instruct the terminal device not to send the SRS on the M symbols in the at least two symbols, and M is an integer greater than 0. The processing unit 1402 is configured to send, based on the first information and the second information that are received by the transceiver unit 1401, the SRS by using the transceiver unit 1401 on a symbol that is in the at least two symbols and that is different from the M symbols.

In a possible implementation, that the second information is used to instruct the terminal device not to send the SRS on the M symbols in the at least two symbols specifically means: the second information is used to instruct the terminal device to send, on the M symbols in the at least two symbols, another uplink signal different from the SRS.

In a possible implementation, the transceiver unit 1401 is further configured to: after the processing unit 1402 sends the SRS by using the transceiver unit 1401 on the symbol that is in the at least two symbols and that is different from the M symbols, receive scheduling information sent by the network device, where the scheduling information is used to schedule the terminal device to send the SRS in a second slot that follows the first slot, and the SRS sent in the second slot is a subset of the SRS that is indicated in the first information and that is sent on the at least two symbols; and send, based on the scheduling information, the SRS in the second slot that follows the first slot.

In a possible implementation, when the processing unit 1402 sends the SRS on the symbol that is in the at least two symbols and that is different from the M symbols, the processing unit 1402 is specifically configured to send the SRS by using the transceiver unit 1401 at a first power on the symbol that is in the at least two symbols and that is different from the M symbols. The processing unit 1402 is further configured to send the SRS or another uplink signal different from the SRS by using the transceiver unit 1401 at a second power on the M symbols, where the second power is less than the first power.

In a possible implementation, the transceiver unit 1401 is further configured to: after the processing unit 1402 sends the SRS or the another uplink signal different from the SRS by using the transceiver unit 1401 at the second power on the M symbols, send a notification message to the network device, where the notification message is used by the network device to determine that a transmit power of the terminal device on the M symbols is the second power.

In a possible implementation, the another uplink signal may include uplink control signaling.

Figure 15:
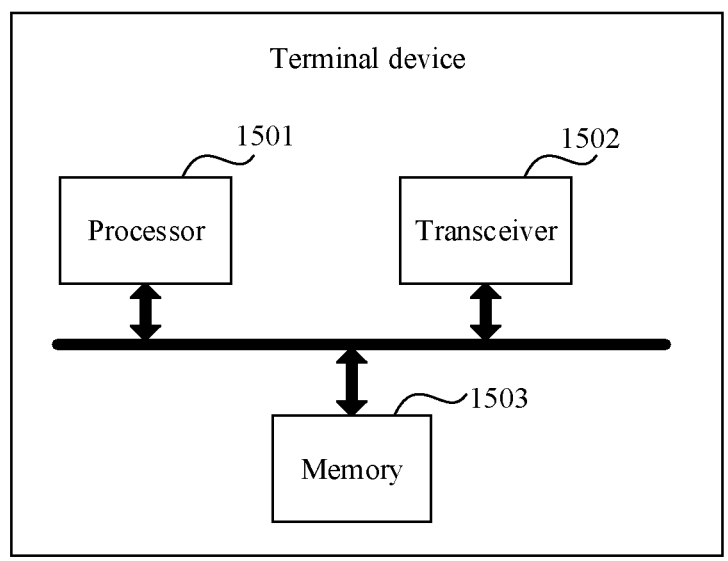
FIG. 15 is a schematic structural diagram of another terminal device according to an embodiment of this application.

Based on a same invention concept, an embodiment of this application further provides a terminal device. The terminal device uses the method performed by the terminal device in the method provided in the embodiment corresponding to FIG. 5, and may be a device same as the terminal device shown in FIG. 14. Referring to FIG. 15, the terminal device includes a processor 1501, a transceiver 1502, and a memory 1503.

The processor 1501 is configured to read a program in the memory 1503, to execute the following process:

receiving, by using transceiver 1502, first information sent by a network device, where the first information is used to instruct the terminal device to send a sounding reference signal SRS on at least two symbols in a first slot; receiving second information sent by the network device, where the second information is used to instruct the terminal device not to send the SRS on the M symbols in the at least two symbols, and M is an integer greater than 0; and sending, based on the first information and the second information that are received by the transceiver 1502, the SRS by using the transceiver 1502 on the symbol that is in the at least two symbols and that is different from the M symbols. The transceiver 1502 is configured to receive and send data under control of the processor 1501. The transceiver 1502 may also be a communications module, and the communications module includes a communications interface configured to receive data and/or send data.

In a possible implementation, that the second information is used to instruct the terminal device not to send the SRS on the M symbols in the at least two symbols specifically means: the second information is used to instruct the terminal device to send, on the M symbols in the at least two symbols, another uplink signal different from the SRS.

In a possible implementation, the processor 1501 is further configured to: after the processor 1501 sends the SRS by using the transceiver 1502 on the symbol that is in the at least two symbols and that is different from the M symbols, receive scheduling information sent by the network device, where the scheduling information is used to schedule the terminal device to send the SRS in a second slot that follows the first slot, and the SRS sent in the second slot is a subset of the SRS that is indicated in the first information and that is sent on the at least two symbols; and send, based on the scheduling information, the SRS in the second slot that follows the first slot.

In a possible implementation, when the processor 1501 sends the SRS on the symbol that is in the at least two symbols and that is different from the M symbols, the processor 1501 is specifically configured to send the SRS by using the transceiver 1502 at a first power on the symbol that is in the at least two symbols and that is different from the M symbols. The processor 1501 is further configured to send the SRS or another uplink signal different from the SRS by using the transceiver 1502 at a second power on the M symbols, where the second power is less than the first power.

In a possible implementation, the processor 1501 is further configured to: after the processor 1501 sends the SRS or the another uplink signal different from the SRS by using the transceiver 1502 at the second power on the M symbols, send a notification message to the network device, where the notification message is used by the network device to determine that a transmit power of the terminal device on the M symbols is the second power.

In a possible implementation, the another uplink signal may include uplink control signaling.

The processor 1501, the transceiver 1502, and the memory 1503 are connected to each other by using a bus. The bus may be a peripheral component interconnect (peripheral component interconnect, PCI) bus, an extended industry standard architecture (extended industry standard architecture, EISA) bus, or the like. The bus may be classified into an address bus, a data bus, a control bus, and the like.

In FIG. 15, a bus architecture may include any quantity of interconnected buses and bridges, and specifically links various circuits of one or more processors represented by the processor 1501 and a memory represented by the memory 1503. The bus architecture may further link together various other circuits such as a peripheral device, a voltage stabilizer, and a power management circuit. These are all well known in the art, and therefore are not further described in this specification. A bus interface provides an interface. The transceiver 1502 may be a plurality of components. To be specific, the transceiver 1502 includes a transmitter and a transceiver, and provides a unit configured to communicate with various other apparatuses on a transmission medium. The processor 1501 is responsible for bus architecture management and general processing. The memory 1503 may store data used by the processor 1501 when the processor 1501 performs an operation.

In a possible implementation, the processor 1501 may be a central processor, an application-specific integrated circuit (application specific integrated circuit, ASIC), a field programmable gate array (field-programmable gate array, FPGA), or a complex programmable logic device (complex programmable logic device, CPLD).

Figure 16:
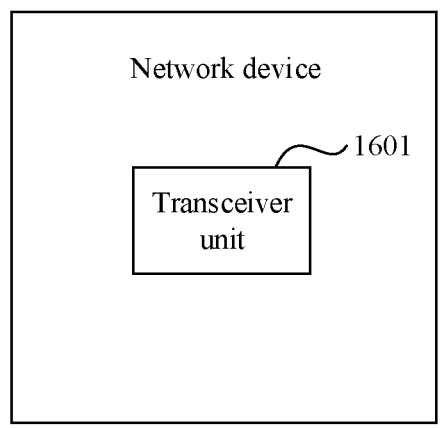
FIG. 16 is a schematic structural diagram of a network device according to an embodiment of this application.

Based on a same invention concept, an embodiment of this application further provides a network device, and the network device may implement the method performed by the network device in the method provided in the embodiment corresponding to FIG. 5. Referring to FIG. 16, the network device includes a transceiver unit 1601. The transceiver unit 1601 is configured to: sends, to a terminal device, first information used to instruct the terminal device to send an SRS on at least two symbols in a first slot, and second information used to instruct the terminal device not to send the SRS on M symbols in the at least two symbols; and receive the SRS sent by the terminal device on a symbol that is in the at least two symbols and that is different from the M symbols, where M is an integer greater than 0.

In a possible implementation, that the second information is used to instruct the terminal device not to send the SRS on the M symbols in the at least two symbols specifically means: the second information is used to instruct the terminal device to send, on the M symbols in the at least two symbols, another uplink signal different from the SRS.

In a possible implementation, the transceiver unit 1601 is further configured to: after receiving the SRS sent by the terminal device on the symbol that is in the at least two symbols and that is different from the M symbols, send scheduling information to the terminal device, where the scheduling information is used to schedule the terminal device to send the SRS in a second slot that follows the first slot, and the SRS sent in the second slot is a subset of the SRS that is indicated in the first information and that is sent on the at least two symbols; and after sending the scheduling information to the terminal device, receive the SRS sent in the second slot that follows the first slot.

In a possible implementation, when the transceiver unit 1601 receives the SRS sent by the terminal device on the symbol that is in the at least two symbols and that is different from the M symbols, the transceiver unit 1601 is specifically configured to send the SRS at a first power on the symbol that is in the at least two symbols and that is different from the M symbols. The transceiver unit 1601 is further configured to receive the SRS or another uplink signal different from the SRS sent at a second power on the M symbols, where the second power is less than the first power.

In a possible implementation, the transceiver unit 1601 is further configured to receive a notification message sent by the terminal device, where the notification message is used by the network device to determine that a transmit power of the terminal device on the M symbols is the second power.

In a possible implementation, the another uplink signal may include uplink control signaling.

Figure 17:
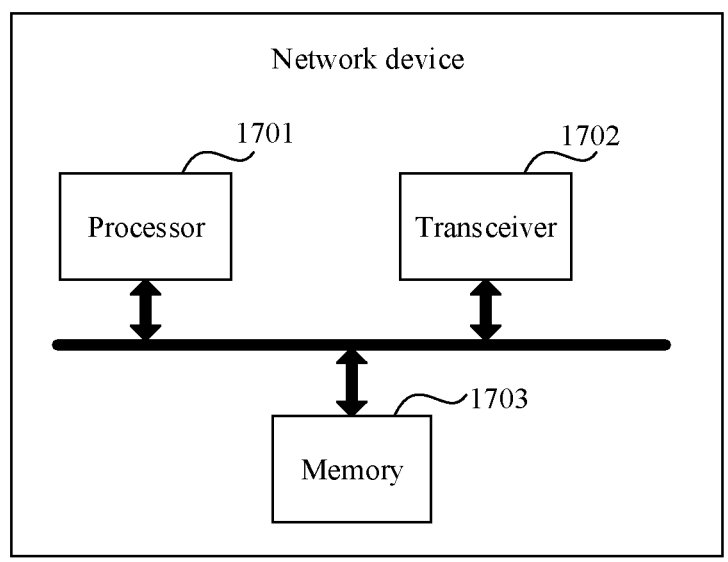
FIG. 17 is a schematic structural diagram of another network device according to an embodiment of this application.

Based on a same invention concept, an embodiment of this application further provides a network device. The network device uses the method performed by the network device in the method provided in the embodiment corresponding to FIG. 5, and may be a device same as the network device shown in FIG. 16. Referring to FIG. 17, the network device includes a processor 1701, a transceiver 1702, and a memory 1703. The processor 1701 is configured to read a program in the memory 1703, to execute the following process: sending, to a terminal device by using the transceiver 1702, first information used to instruct the terminal device to send an SRS on at least two symbols in a first slot, and second information used to instruct the terminal device not to send the SRS on M symbols in the at least two symbols; and receiving the SRS sent by the terminal device on a symbol that is in the at least two symbols and that is different from the M symbols, where M is an integer greater than 0. The transceiver 1702 is configured to receive and send data under control of the processor 1701. The transceiver 1702 may also be a communications module, and the communications module includes a communications interface configured to receive data and/or send data.

In a possible implementation, that the second information is used to instruct the terminal device not to send the SRS on the M symbols in the at least two symbols specifically means: the second information is used to instruct the terminal device to send, on the M symbols in the at least two symbols, another uplink signal different from the SRS.

In a possible implementation, the processor 1701 is further configured to: after receiving, by using the transceiver 1702, the SRS sent by the terminal device on the symbol that is in the at least two symbols and that is different from the M symbols, send scheduling information to the terminal device, where the scheduling information is used to schedule the terminal device to send the SRS in a second slot that follows the first slot, and the SRS sent in the second slot is a subset of the SRS that is indicated in the first information and that is sent on the at least two symbols; and after sending the scheduling information to the terminal device, receive the SRS sent in the second slot that follows the first slot.

In a possible implementation, when the processor 1701 receives the SRS sent by the terminal device on the symbol that is in the at least two symbols and that is different from the M symbols, the processor 1701 is specifically configured to send the SRS by using the transceiver 1702 at a first power on the symbol that is in the at least two symbols and that is different from the M symbols. The processor 1701 is further configured to receive the SRS or another uplink signal different from the SRS sent by using the transceiver 1702 at a second power on the M symbols, where the second power is less than the first power.

In a possible implementation, the processor 1701 is further configured to receive, by using the transceiver 1702, a notification message sent by the terminal device, where the notification message is used by the network device to determine that a transmit power of the terminal device on the M symbols is the second power.

In a possible implementation, the another uplink signal may include uplink control signaling.

The processor 1701, the transceiver 1702, and the memory 1703 are connected to each other by using a bus. The bus may be a PCI bus, an EISA bus, or the like. The bus may be classified into an address bus, a data bus, a control bus, and the like.

In FIG. 17, a bus architecture may include any quantity of interconnected buses and bridges, and specifically links various circuits of one or more processors represented by the processor 1701 and a memory represented by the memory 1703. The bus architecture may further link together various other circuits such as a peripheral device, a voltage stabilizer, and a power management circuit. These are all well known in the art, and therefore are not further described in this specification. A bus interface provides an interface. The transceiver 1702 may be a plurality of components. To be specific, the transceiver 1702 includes a transmitter and a transceiver, and provides a unit configured to communicate with various other apparatuses on a transmission medium. The processor 1701 is responsible for bus architecture management and general processing. The memory 1703 may store data used by the processor 1701 when the processor 1701 performs an operation.

In a possible implementation, the processor 1701 may be a central processor, an ASIC, an FPGA, or a CPLD.

Based on a same invention concept, an embodiment of this application further provides a terminal device. The terminal device may implement the method performed by the terminal device in the method provided in the embodiment corresponding to FIG. 8, and a structure of the terminal device is similar to that of the terminal device shown in FIG. 14. Referring to FIG. 14, the terminal device includes a transceiver unit 1401 and a processing unit 1402. The transceiver unit 1401 is configured to: receive first information sent by a network device, where the first information is used to instruct the terminal device to send a sounding reference signal SRS on at least two symbols in a slot; and receive second information sent by the network device, where the second information is used to determine a frequency domain position or a beam identifier occupied when the terminal device sends the SRS. The processing unit 1402 is configured to send, based on the first information and the second information that are received by the transceiver unit 1401, the SRS by using the transceiver unit 1401 in the frequency domain position corresponding to the at least two symbols or on the beam identifier corresponding to the at least two symbols.

In a possible implementation, that the second information is used to determine a frequency domain position occupied when the terminal device sends the SRS specifically means that the second information is used to indicate a frequency domain offset value of the SRS. When the processing unit 1402 sends, based on the first information and the second information, the SRS by using the transceiver unit 1401 in the frequency domain position corresponding to the at least two symbols, the processing unit 1402 is specifically configured to: send, based on the first information and the second information, the SRS by using the transceiver unit 1401 on the at least two symbols in each period from a next period of sending the SRS, where a frequency domain position used when the SRS is sent in each period is obtained by adding the frequency domain offset value to a frequency domain position for sending the SRS in a previous period.

In a possible implementation, that the second information is used to determine the beam identifier occupied when the terminal device sends the SRS specifically means that the second information is used to indicate a beam offset value of the SRS. When the processing unit 1402 sends, based on the first information and the second information, the SRS by using the transceiver unit 1401 on the beam identifier corresponding to the at least two symbols, the processing unit 1402 is specifically configured to: send, based on the first information and the second information, the SRS by using the transceiver unit 1401 on the at least two symbols in each period from a next period of sending the SRS, where a beam identifier used when the SRS is sent in each period is obtained by adding the beam offset value to a beam identifier for sending the SRS in a previous period.

Based on a same invention concept, an embodiment of this application further provides a terminal device. The terminal device uses the method performed by the terminal device in the method provided in the embodiment corresponding to FIG. 8, and may be a device same as the terminal device shown in FIG. 14. A structure of the terminal device is similar to that of the terminal device shown in FIG. 15. Referring to FIG. 15, the terminal device includes a processor 1501, a transceiver 1502, and a memory 1503. The processor 1501 is configured to read a program in the memory 1503, to execute the following process:

receiving, by using the transceiver 1502, first information sent by a network device, where the first information is used to instruct the terminal device to send a sounding reference signal SRS on at least two symbols in a slot, and second information sent by the network device, where the second information is used to determine a frequency domain position or a beam identifier occupied when the terminal device sends the SRS; and sending, based on the first information and the second information, the SRS by using the transceiver 1502 in the frequency domain position corresponding to the at least two symbols or on the beam identifier corresponding to the at least two symbols. The transceiver 1502 is configured to receive and send data under control of the processor 1501. The transceiver 1502 may also be a communications module, and the communications module includes a communications interface configured to receive data and/or send data.

In a possible implementation, that the second information is used to determine a frequency domain position occupied when the terminal device sends the SRS specifically means that the second information is used to indicate a frequency domain offset value of the SRS. When the processor 1501 sends, based on the first information and the second information, the SRS in the frequency domain position corresponding to the at least two symbols, the processor 1501 is specifically configured to: send, based on the first information and the second information, the SRS by using the transceiver 1502 on the at least two symbols in each period from a next period of sending the SRS, where a frequency domain position used when the SRS is sent in each period is obtained by adding the frequency domain offset value to a frequency domain position for sending the SRS in a previous period.

In a possible implementation, that the second information is used to determine the beam identifier occupied when the terminal device sends the SRS specifically means that the second information is used to indicate a beam offset value of the SRS. When the processor 1501 sends, based on the first information and the second information, the SRS on the beam identifier corresponding to the at least two symbols, the processor 1501 is specifically configured to: send, based on the first information and the second information, the SRS by using the transceiver 1502 on the at least two symbols in each period from a next period of sending the SRS, where a beam identifier used when the SRS is sent in each period is obtained by adding the beam offset value to a beam identifier for sending the SRS in a previous period.

Based on a same invention concept, an embodiment of this application further provides a network device. The network device may implement the method performed by the network device in the method provided in the embodiment corresponding to FIG. 8, and a structure of the network device is similar to that of the network device shown in FIG. 16. Referring to FIG. 16, the network device includes a transceiver unit 1601. The transceiver unit 1601 is configured to send, to a terminal device, first information used to instruct the terminal device to send a sounding reference signal SRS on at least two symbols in a slot; send, to the terminal device, second information used to determine a frequency domain position or a beam identifier occupied when the terminal device sends the SRS; and receive the SRS sent by the terminal device in the frequency domain position corresponding to the at least two symbols or on the beam identifier corresponding to the at least two symbols.

In a possible implementation, that the second information is used to determine a frequency domain position occupied when the terminal device sends the SRS specifically means that the second information is used to indicate a frequency domain offset value of the SRS. When the transceiver unit 1601 receives the SRS sent by the terminal device in the frequency domain position corresponding to the at least two symbols, the transceiver unit 1601 is specifically configured to receive the SRS sent by the terminal device on the at least two symbols in each period from a next period of sending the SRS, and a frequency domain position used when the SRS is sent in each period is obtained by adding the frequency domain offset value to a frequency domain position for sending the SRS in a previous period.

In a possible implementation, that the second information is used to determine the beam identifier occupied when the terminal device sends the SRS specifically means that the second information is used to indicate a beam offset value of the SRS. When the transceiver unit 1601 receives the SRS sent by the terminal device on the beam identifier corresponding to the at least two symbols, the transceiver unit 1601 is specifically configured to receive the SRS sent by the terminal device on the at least two symbols in each period from a next period of sending the SRS, and a frequency domain position used when the SRS is sent in each period is obtained by adding the frequency domain offset value to a frequency domain position for sending the SRS in a previous period.

Based on a same invention concept, an embodiment of this application further provides a network device. The network device uses the method performed by the network device in the method provided in the embodiment corresponding to FIG. 8, and may be a device same as the network device shown in FIG. 17. A structure of the network device is similar to that of the network device shown in FIG. 17. Referring to FIG. 17, the network device includes a processor 1701, a transceiver 1702, and a memory 1703. The processor 1701 is configured to read a program in the memory 1703, to execute the following process:

The transceiver 1702 is configured to send, to a terminal device, first information used to instruct the terminal device to send a sounding reference signal SRS on at least two symbols in a slot; send, to the terminal device, second information used to determine a frequency domain position or a beam identifier occupied when the terminal device sends the SRS; and receive the SRS sent by the terminal device in the frequency domain position corresponding to the at least two symbols or on the beam identifier corresponding to the at least two symbols.

The transceiver 1702 is configured to receive and send data under control of the processor 1701. The transceiver 1702 may also be a communications module, and the communications module includes a communications interface configured to receive data and/or send data.

In a possible implementation, that the second information is used to determine a frequency domain position occupied when the terminal device sends the SRS specifically means that the second information is used to indicate a frequency domain offset value of the SRS. When the processor 1701 receives the SRS sent by the terminal device in the frequency domain position corresponding to the at least two symbols, the processor 1701 is specifically configured to receive, by using the transceiver 1702, the SRS sent by the terminal device on the at least two symbols in each period from a next period of sending the SRS, and a frequency domain position used when the SRS is sent in each period is obtained by adding the frequency domain offset value to a frequency domain position for sending the SRS in a previous period.

In a possible implementation, that the second information is used to determine the beam identifier occupied when the terminal device sends the SRS specifically means that the second information is used to indicate a beam offset value of the SRS. When the processor 1701 receives the SRS sent by the terminal device on the beam identifier corresponding to the at least two symbols, the processor 1701 is specifically configured to receive, by using the transceiver 1702, the SRS sent by the terminal device on the at least two symbols in each period from a next period of sending the SRS, and a frequency domain position used when the SRS is sent in each period is obtained by adding the frequency domain offset value to a frequency domain position for sending the SRS in a previous period.

Based on a same invention concept, an embodiment of this application further provides a terminal device. The terminal device may implement the method performed by the terminal device in the method provided in the embodiment corresponding to FIG. 10, and a structure of the terminal device is similar to that of the terminal device shown in FIG. 14. Referring to FIG. 14, the terminal device includes a transceiver unit 1401 and a processing unit 1402. The transceiver unit 1401 is configured to: receive first information sent by a network device, where the first information is used to instruct the terminal device to send a first uplink signal of a first system on at least two symbols in a slot; and receive second information sent by the network device, where the second information is used to indicate that a second uplink signal of a second system occupies N symbols in the at least two symbols, where N is an integer greater than 0. The processing unit 1402 is configured to send, based on the first information and the second information that are received by the transceiver unit 1401, the first uplink signal by using the transceiver unit 1401 on a symbol that is in the at least two symbols and that is different from the N symbols.

In a possible implementation, when the processing unit 1402 sends the first uplink signal on the symbol that is in the at least two symbols and that is different from the M symbols, the processing unit 1402 is specifically configured to: send all signals or some signals in the first uplink signal by using the transceiver unit 1401 on the symbol that is in the at least two symbols and that is different from the N symbols; or send a third uplink signal of the second system by using the transceiver unit 1401 on the N symbols, where the third uplink signal carries information or a function carried in the first uplink signal that is not sent on the N symbols.

In a possible implementation, the first uplink signal and/or the second uplink signal include/includes one of or a combination of the following signals: a sounding reference signal SRS, uplink control signaling, and an uplink signal used for random access.

In a possible implementation, the first system is a 5G system, and the second system is a long term evolution LTE system.

Based on a same invention concept, an embodiment of this application further provides a terminal device. The terminal device uses the method performed by the terminal device in the method provided in the embodiment corresponding to FIG. 10, and may be a device same as the terminal device shown in FIG. 14. A structure of the terminal device is similar to that of the terminal device shown in FIG. 15. Referring to FIG. 15, the terminal device includes a processor 1501, a transceiver 1502, and a memory 1503. The processor 1501 is configured to read a program in the memory 1503, to execute the following process:

receiving, by using the transceiver 1502, first information sent by a network device, where the first information is used to instruct the terminal device to send a first uplink signal of a first system on at least two symbols in a slot; receiving second information sent by the network device, where the second information is used to indicate that a second uplink signal of a second system occupies N symbols in the at least two symbols, where N is an integer greater than 0; and sending, by the transceiver 1502 based on the first information and the second information that are received by the transceiver 1502 by using the processor 1501, the first uplink signal by using the processor 1501 on a symbol that is in the at least two symbols and that is different from the N symbols.

The transceiver 1502 is configured to receive and send data under control of the processor 1501. The transceiver 1502 may also be a communications module, and the communications module includes a communications interface configured to receive data and/or send data.

In a possible implementation, when the processor 1501 sends the first uplink signal on the symbol that is in the at least two symbols and that is different from the M symbols, the processor 1501 is specifically configured to: send all signals or some signals in the first uplink signal by using the transceiver 1502 on the symbol that is in the at least two symbols and that is different from the N symbols; or send a third uplink signal of the second system by using the transceiver 1502 on the N symbols, where the third uplink signal carries information or a function carried in the first uplink signal that is not sent on the N symbols.

In a possible implementation, the first uplink signal and/or the second uplink signal include/includes one of or a combination of the following signals: a sounding reference signal SRS, uplink control signaling, and an uplink signal used for random access.

In a possible implementation, the first system is a 5G system, and the second system is a long term evolution LTE system.

Based on a same invention concept, an embodiment of this application further provides a network device. The network device may implement the method performed by the network device in the method provided in the embodiment corresponding to FIG. 10, and a structure of the terminal device is similar to that of the terminal device shown in FIG. 16. Referring to FIG. 16, the network device includes a transceiver unit 1601. The transceiver unit 1601 is configured to send first information to a terminal device, where the first information is used to instruct the terminal device to send a first uplink signal of a first system on at least two symbols in a slot; send second information to the terminal device, where the second information is used to indicate that a second uplink signal of a second system occupies N symbols in the at least two symbols, where N is an integer greater than 0; and receive the first uplink signal sent by the terminal device on the symbol that is in the at least two symbols and that is different from the N symbols.

In a possible implementation, when the transceiver unit 1601 receives the first uplink signal sent by the terminal device on the symbol that is in the at least two symbols and that is different from the M symbols, the transceiver unit 1601 is specifically configured to: receive all signals or some signals in the first uplink signal sent by the terminal device on the symbol that is in the at least two symbols and that is different from the N symbols; or receive a third uplink signal that is of the second system and that is sent by the terminal device on the N symbols, where the third uplink signal carries information or a function carried in the first uplink signal that is not sent on the N symbols.

In a possible implementation, the first uplink signal and/or the second uplink signal include/includes one of or a combination of the following signals: a sounding reference signal SRS, uplink control signaling, and an uplink signal used for random access.

In a possible implementation, the first system is a 5G system, and the second system is a long term evolution LTE system.

Based on a same invention concept, an embodiment of this application further provides a network device. The network device uses the method performed by the network device in the method provided in the embodiment corresponding to FIG. 10, and may be a device same as the network device shown in FIG. 16. A structure of the terminal device is similar to that of the terminal device shown in FIG. 17. Referring to FIG. 17, the network device includes a processor 1701, a transceiver 1702, and a memory 1703. The processor 1701 is configured to read a program in the memory 1703, to execute the following process:

sending, by using the transceiver 1702, first information to a terminal device, where the first information is used to instruct the terminal device to send a first uplink signal of a first system on at least two symbols in a slot; sending, by using the transceiver 1702, second information to the terminal device, where the second information is used to indicate that a second uplink signal of a second system occupies N symbols in the at least two symbols, where N is an integer greater than 0; and receiving, by using the transceiver 1702, the first uplink signal sent by the terminal device on the symbol that is in the at least two symbols and that is different from the N symbols.

The transceiver 1702 is configured to receive and send data under control of the processor 1701. The transceiver 1702 may also be a communications module, and the communications module includes a communications interface configured to receive data and/or send data.

In a possible implementation, when the processor 1701 receives the first uplink signal sent by the terminal device on the symbol that is in the at least two symbols and that is different from the M symbols, the processor 1701 is specifically configured to: receive, by using the transceiver 1702, all signals or some signals in the first uplink signal sent by the terminal device on the symbol that is in the at least two symbols and that is different from the N symbols; or receive, by using the transceiver 1702, a third uplink signal that is of the second system and that is sent by the terminal device on the N symbols, where the third uplink signal carries information or a function carried in the first uplink signal that is not sent on the N symbols.

In a possible implementation, the first uplink signal and/or the second uplink signal include/includes one of or a combination of the following signals: a sounding reference signal SRS, uplink control signaling, and an uplink signal used for random access.

In a possible implementation, the first system is a 5G system, and the second system is a long term evolution LTE system.

It should be noted that the unit division in the embodiments of this application is an example, and is merely logical function division. There may be another division manner in an actual implementation. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a personal computer, a server, a network device or the like) or a processor (processor) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

An embodiment of this application provides a computer program product including an instruction, and when the computer program product is run on a computer, the computer is enabled to perform the uplink signal transmission method performed by the terminal device in the foregoing embodiments, or the computer is enabled to perform the uplink signal transmission method performed by the network device in the foregoing embodiments.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of the embodiments of this application. This application is intended to cover these modifications and variations of the embodiments of this application provided that they fall within the scope defined by the following claims and their equivalent technologies.

What is claimed is:

1. An uplink signal transmission method, performed by a terminal device, the method comprising:
   receiving, first information from a network device, wherein the first information instructs the terminal device to transmit a sounding reference signal (SRS) in a first set of symbols in a first slot, wherein the first set of symbols comprises at least two symbols;
   receiving second information from the network device, wherein the second information indicates a second set of symbols for transmitting an uplink control signal by the terminal device;
   transmitting, based on the first information and the second information, the SRS in a subset, excluding M symbols of the first set of symbols, wherein the M symbols comprise overlapped symbols between the second set of symbols and the first set of symbols and M is an integer greater than 0.

2. The method according to claim 1, wherein the M symbols comprises the last symbol of the first slot.

3. The method according to claim 1, wherein the receiving first information from the network device further comprises:
   receiving a configuration message from the network device, wherein the configuration message comprises the first information; and
   the configuration message further comprises an indication of at least one of: a start frequency-domain position, the first slot, a symbol occupied by the SRS in one slot, a start symbol occupied by the SRS in one slot, an end symbol occupied by the SRS in one slot, a frequency domain position occupied by the SRS on each symbol, a period, and a code domain sequence.

4. The method according to claim 1, further comprising dropping symbols of the SRS in the M symbols.

5. An electronic device, comprising:
   at least one processor; and
   at least one memory, the at least one memory comprising instructions that, when executed by the at least one processor, cause the electronic device to:

receive first information from a network device, wherein the first information instructs a terminal device to transmit a sounding reference signal (SRS) in a first set of symbols in a first slot, wherein the first set of symbols comprises at least two symbols;

receive second information from the network device, wherein the second information indicates a second set of symbols for transmitting uplink control signal by the terminal device; and transmit based on the first information and the second information, the SRS in a subset, excluding M symbols, of the first set of symbols, wherein the M symbols comprise overlapped symbols between the second set of symbols and the first set of symbols and M is an integer greater than 0.

6. The electronic device according to claim 5, wherein the M symbols comprises the last symbol of the first slot.

7. The electronic device according to claim 5, wherein the receive first information from the network device, comprises:

receive a configuration message from the network device, wherein the configuration message comprises the first information; and the configuration message further comprises an indication of at least one of: a start frequency-domain position, the first slot, a symbol occupied by the SRS in one slot, a start symbol occupied by the SRS in one slot, an end symbol occupied by the SRS in one slot, a frequency domain position occupied by the SRS on each symbol, a period, and a code domain sequence.

8. The electronic device according to claim 5, wherein the instructions, when executed by the at least one processor, further cause the electronic device to: drop symbols of the SRS in the M symbols.

9. A computer program product comprising computer-executable instructions for storage on a non-transitory computer-readable medium that, when executed by an electronic device, cause the electronic device to:

receive first information from a network device, wherein the first information instructs the electronic device to transmit a sounding reference signal (SRS) in a first set of symbols in a first slot, wherein the first set of symbols comprises at least two symbols;

receive second information from the network device, wherein the second information indicates a second set of symbols for transmitting an uplink control signal by the electronic device; and transmit based on the first information and the second information, the SRS in a subset, excluding M symbols, of the first set of symbols, wherein the M symbols comprise overlapped symbols between the second set of symbols and the first set of symbols and M is an integer greater than 0.

10. The computer program product of claim 9, wherein the M symbols comprises the last symbol of the slot.

11. The computer program product of claim 9, wherein the receive first information from the network device, comprises:

receive a configuration message from the network device, wherein the configuration message comprises the first information; and the configuration message further comprises an indication of at least one of: a start frequency-domain position, the first slot, a symbol occupied by the SRS in one slot, a start symbol occupied by the SRS in one slot, an end symbol occupied by the SRS in one slot, a frequency domain position occupied by the SRS on each symbol, a period, and a code domain sequence.

12. The computer program product of claim 9, wherein the instructions, when executed by the electronic device, further cause the electronic device to: drop symbols of the SRS in the M symbols.

13. An uplink signal transmission method, performed by a network device, the method comprising:

sending first information to a terminal device, wherein the first information instructs the terminal device to transmit a sounding reference signal, SRS, in a first set of symbols in a first slot, wherein the first set of symbols comprises at least two symbols;

sending second information to the terminal device, wherein the second information indicates a second set of symbols for transmitting an uplink control signal by the terminal device; and receiving based on the first information and the second information, the SRS in a subset, excluding M symbols, of the first set of symbols, wherein the M symbols comprise overlapped symbols between the second set of symbols and the first set of symbols and M is an integer greater than 0.

14. The method of claim 13, wherein the M symbols comprises the last symbol of the first slot.

15. The method of claim 13, wherein the sending first information to a terminal device comprises:

sending a configuration message the terminal device, wherein the configuration message comprises the first message, and the configuration message further comprises an indication of at least one of: a start frequency-domain position, the first slot, a symbol occupied by the SRS in one slot, a start symbol occupied by the SRS in one slot, an end symbol occupied by the SRS in one slot, a frequency domain position occupied by the SRS on each symbol, a period, and a code domain sequence.

16. The method according of claim 13, wherein receiving the SRS in a subset, excluding M symbols, of the first set of symbols comprises:

not receiving symbols of the SRS in the M symbols.

17. An electronic device, comprising:

at least one processor; and at least one memory, the at least one memory comprising instructions that, when executed by the at least one processor, cause the electronic device to:

send first information to a terminal device, wherein the first information instructs the terminal device to transmit a sounding reference signal, SRS, in a first set of symbols in a first slot, wherein the first set of symbols comprises at least two symbols;

send second information to the terminal device, wherein the second information indicates a second set of symbols for transmitting an uplink control signal; and receive based on the first information and the second information, the SRS in a subset, excluding M symbols, of the first set of symbols, wherein the M symbols comprise overlapped symbols between the second set of symbols and the first set of symbols and M is an integer greater than 0.

18. The electronic device of claim 17, wherein the M symbols comprises the last symbol of the first slot.

19. The electronic device of claim 17, wherein the send first information to a terminal device comprises:

send a configuration message the terminal device, wherein the configuration message comprises the first message, and the configuration message further comprises an indication of at least one of: a start frequency-domain position, the first slot, a symbol occupied by the SRS in one slot, a start symbol occupied by the SRS in one slot, an end symbol occupied by the SRS in one slot, a frequency domain position occupied by the SRS on each symbol, a period, and a code domain sequence.

20. The electronic device according of claim 17, wherein receive the SRS in a subset, excluding M symbols, of the first set of symbols comprises:
not receive symbols of the SRS in the M symbols.

* * * * *